(12) United States Patent
Maruo et al.

(10) Patent No.: US 9,764,723 B2
(45) Date of Patent: Sep. 19, 2017

(54) BRAKE UNIT

(71) Applicant: HITACHI AUTOMOTIVE SYSTEMS, LTD., Hitachinaka-shi, Ibaraki (JP)

(72) Inventors: Ryohei Maruo, Kawasaki (JP); Masayuki Saito, Sagamihara (JP); Chiharu Nakazawa, Kawasaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 125 days.

(21) Appl. No.: 14/421,207

(22) PCT Filed: Aug. 22, 2013

(86) PCT No.: PCT/JP2013/072357
§ 371 (c)(1),
(2) Date: Feb. 12, 2015

(87) PCT Pub. No.: WO2014/045791
PCT Pub. Date: Mar. 27, 2014

(65) Prior Publication Data
US 2015/0203085 A1 Jul. 23, 2015

(30) Foreign Application Priority Data
Sep. 21, 2012 (JP) ................. 2012-208638

(51) Int. Cl.
*B60T 13/16* (2006.01)
*B60T 13/14* (2006.01)
(Continued)

(52) U.S. Cl.
CPC ............ *B60T 13/143* (2013.01); *B60T 8/368* (2013.01); *B60T 8/3685* (2013.01); *B60T 11/16* (2013.01);
(Continued)

(58) Field of Classification Search
CPC ........ B60T 13/143; B60T 8/363; B60T 8/368; B60T 8/3685; B60T 7/042; B60T 13/745; B60T 11/16; B60T 17/02; B60T 8/4081
(Continued)

(56) References Cited

U.S. PATENT DOCUMENTS 4,790,729 A   12/1988 Zirps
4,998,781 A   3/1991 Kehl et al.
(Continued)

FOREIGN PATENT DOCUMENTS

JP   62-289463 A   12/1987
JP   02-175373 A   7/1990
(Continued)

*Primary Examiner* — Pamela Rodriguez
(74) *Attorney, Agent, or Firm* — Foley & Lardner LLP

(57) ABSTRACT

A brake unit (1) includes: a master cylinder (2) unit which is fixed to a vehicle body, and which includes a master cylinder (2b) that is received within a first housing (20), and that is arranged to be interlocked with a brake pedal; and a pump unit (3) which is arranged to be driven by a motor (3), and which includes a second housing (30) within which a pump arranged to increase a wheel cylinder pressure is received, the master cylinder unit (2) and the pump unit (3) being integrally fixed through a mount (6) which is an elastic member.

13 Claims, 21 Drawing Sheets

(51) Int. Cl.
  *B60T 11/16* (2006.01)
  *B60T 13/74* (2006.01)
  *B60T 17/02* (2006.01)
  *B60T 8/36* (2006.01)
  *B60T 8/40* (2006.01)

(52) U.S. Cl.
  CPC ............ *B60T 13/745* (2013.01); *B60T 17/02* (2013.01); *B60T 8/4081* (2013.01)

(58) Field of Classification Search
  USPC .... 303/10, 87, 116.1, 119.1, 119.3, DIG. 10; 248/635, 636, 638
  See application file for complete search history.

(56) References Cited

U.S. PATENT DOCUMENTS

| | | | | |
|---|---|---|---|---|
| 5,634,695 | A * | 6/1997 | Ohta | B60T 8/363 303/10 |
| 6,250,724 | B1 * | 6/2001 | Shimizu | B60T 8/368 303/116.4 |
| 6,913,326 | B1 | 7/2005 | Ohkubo et al. | |
| 7,004,552 | B2 * | 2/2006 | Takumori | B60T 8/3685 303/116.4 |
| 8,864,246 | B2 * | 10/2014 | Kodama | B60T 8/3685 303/119.3 |
| 2002/0190572 | A1 | 12/2002 | Nakazawa | |
| 2004/0207254 | A1 | 10/2004 | Nakazawa | |
| 2005/0057089 | A1 * | 3/2005 | Kondo | B60T 8/3685 303/87 |
| 2005/0242661 | A1 | 11/2005 | Nakazawa | |
| 2007/0057422 | A1 * | 3/2007 | Weh | B60T 8/3685 267/141 |
| 2008/0272646 | A1 * | 11/2008 | Nakazawa | B60T 8/368 303/155 |
| 2012/0241036 | A1 * | 9/2012 | Kodama | B60T 8/3685 137/899 |
| 2015/0298674 | A1 * | 10/2015 | Kratzer | B60T 7/042 303/10 |

FOREIGN PATENT DOCUMENTS

| | | |
|---|---|---|
| JP | 5-44738 U | 6/1993 |
| JP | 08-282459 A | 10/1996 |
| JP | 2000-159094 A | 6/2000 |
| JP | 2002-370635 A | 12/2002 |

* cited by examiner

BRAKE UNIT

TECHNICAL FIELD

This invention relates to a brake unit.

BACKGROUND ART

Conventionally, there is known a brake unit mounted on a vehicle. For example, there is known a brake unit described in a following patent document.

PRIOR ART DOCUMENT

Patent Document

Patent Document 1: Japanese Patent Application Publication No. 2000-159094

SUMMARY OF THE INVENTION

Problems which the Invention is Intended to Solve

However, in the conventional brake unit, the vibration may be transmitted to a vehicle body side. It is, therefore, an object of the present invention to provide a brake unit devised to suppress the transmission of the vibration to the vehicle body's side.

Means for Solving the Problem

For attaining the above-described object, a brake unit according to claim 1 of the present invention includes a master cylinder unit and a pump unit. The both units are elastically fixed.

Benefit of the Invention

Accordingly, it is possible to suppress the transmission of the vibration to the vehicle body side.

DESCRIPTION OF EMBODIMENTS

Figure 1:
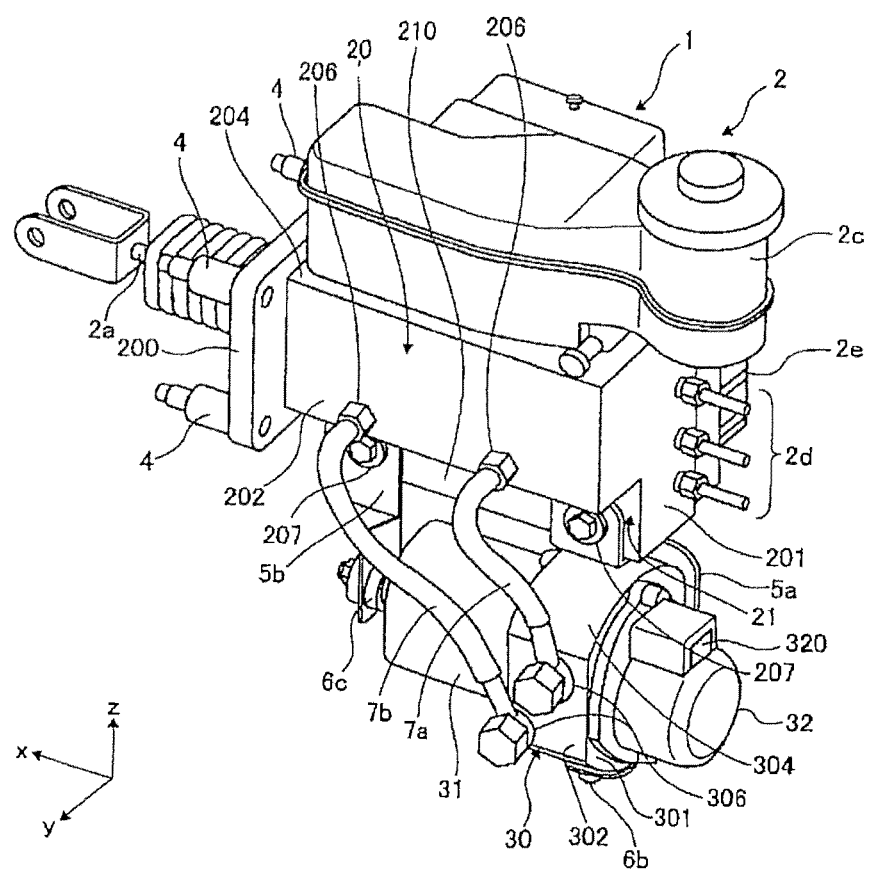
FIG. 1 is a perspective view of a brake unit according to a first embodiment.

Hereinafter, embodiments attaining the brake unit according to the present invention are illustrated based on the drawings.

First Embodiment

A brake unit 1 according to a first embodiment is a unit of an electric control hydraulic pressure brake device which is applied to a control system (brake system) of a vehicle such as a hybrid vehicle and an electric vehicle, which is arranged to generate a regenerative braking force by an electric motor. The brake system according to this embodiment does not include a booster device (brake booster) which is arranged to decrease a brake operation force of a driver, and which is a conventional type (a mastervac disposed between a brake pedal and a master cylinder) that is arranged to be actuated by using a suction negative pressure of an engine. The brake system includes a brake pedal which is an input member of the brake operation of the driver; a master cylinder 2b which is arranged to generate a hydraulic pressure (brake operation hydraulic pressure) according to the brake operation; a brake control unit which is arranged to generate a control hydraulic pressure independently of the brake operation of the driver by using actuators such as a pump serving as a hydraulic pressure source and an electromagnetic valves (solenoid valve) (electromagnetic control valve) 2d; and wheel cylinders which are provided to wheels of the vehicle, and arranged to receive supply of the brake operation hydraulic pressure (master cylinder pressure) and the control hydraulic pressure, and to generate a brake actuation hydraulic pressure (wheel cylinder pressure). The brake control unit is arranged to independently supply the master cylinder pressure or the control hydraulic pressure to the respective wheel cylinders.

A control unit 2e of the brake control unit receives detection values transmitted from a pedal stroke sensor arranged to sense an operation amount of the brake pedal, and a hydraulic pressure sensor arranged to sense a discharge pressure of the pump and the master cylinder pressure, and information relating to a running state transmitted from the vehicle. The control unit 2e of the brake control unit controls the openings and the closings of the electromagnetic valves 2d and a rotation speed of the motor 31 (the discharge amount of the pump) based on installed program. With this, the control unit 2e of the brake control unit performs a boost control configured to decrease the brake operation force, an anti-lock brake control configured to suppress slip of the wheels by the brake, a motion control (behavior control such as an anti-skid control), an automatic brake control such as a preceding vehicle following control, a regenerative cooperative control configured to control the wheel cylinder pressures to attain a target deceleration (a target braking force) in cooperation with the regeneration brake. The boost control is configured to add an assist hydraulic pressure generated by driving the brake control unit (by using the discharge pressure of the pump), to the master cylinder pressure generated in accordance with the brake operation, and thereby to generate the wheel cylinder pressures which are higher than the master cylinder pressure.

Figure 2:
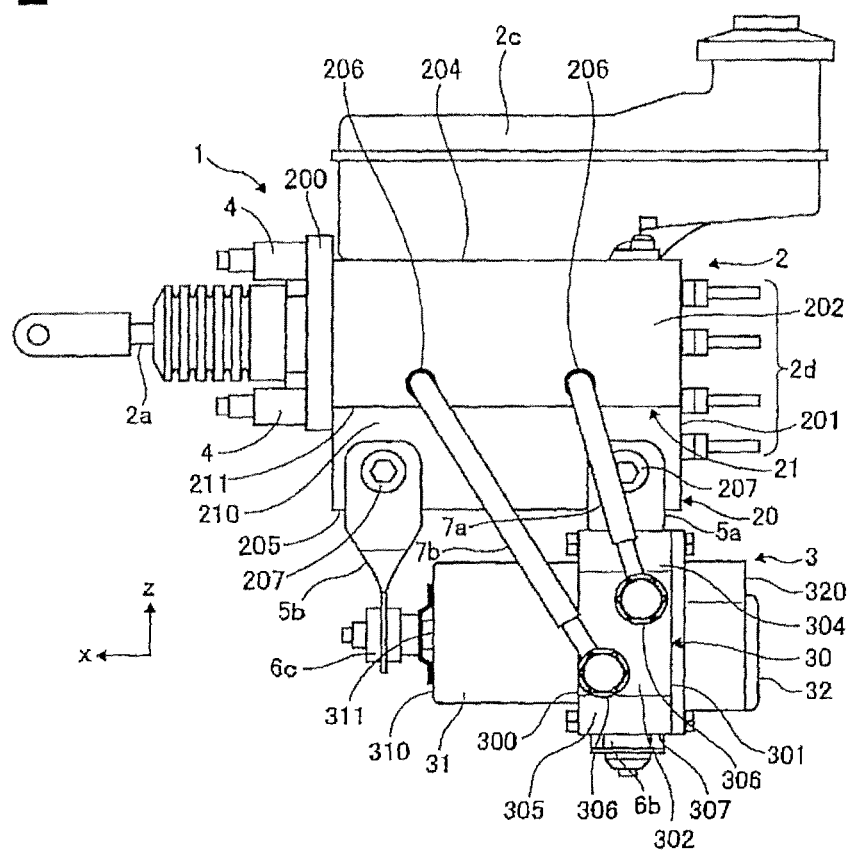
FIG. 2 is a side view of the brake unit according to the first embodiment.
Figure 3:
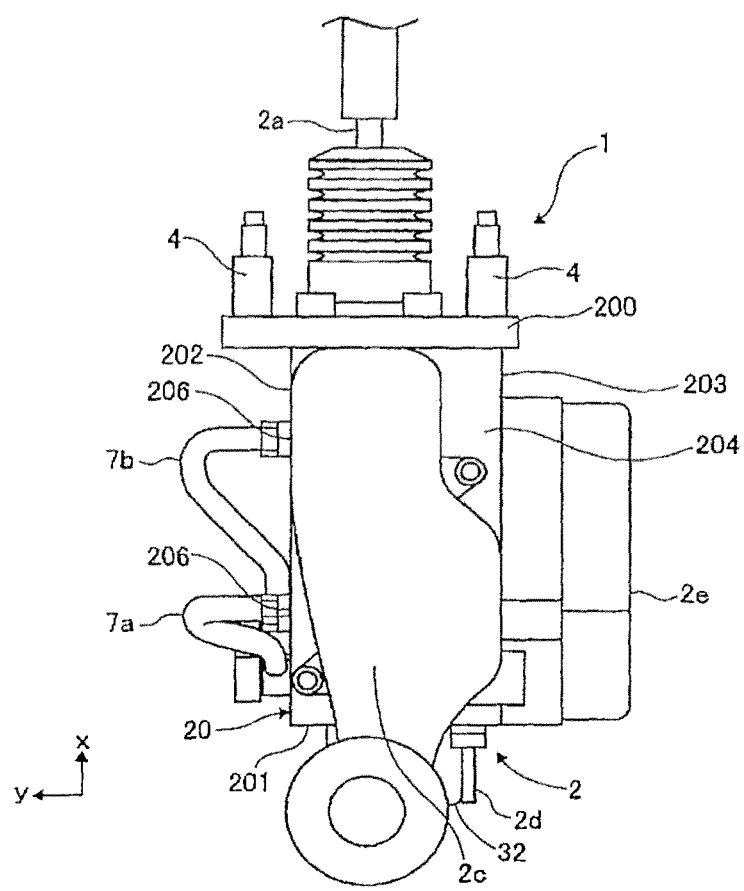
FIG. 3 is a top view of the brake unit according to the first embodiment.
Figure 4:
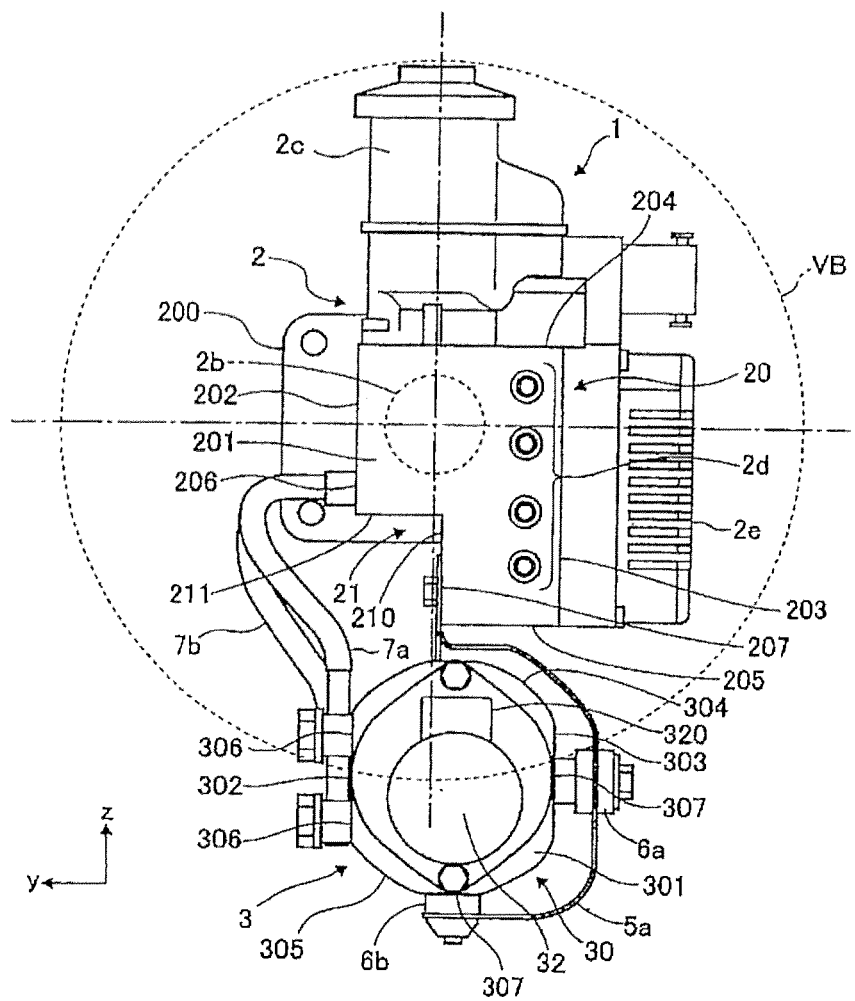
FIG. 4 is a front view of the brake unit according to the first embodiment.
Figure 5:
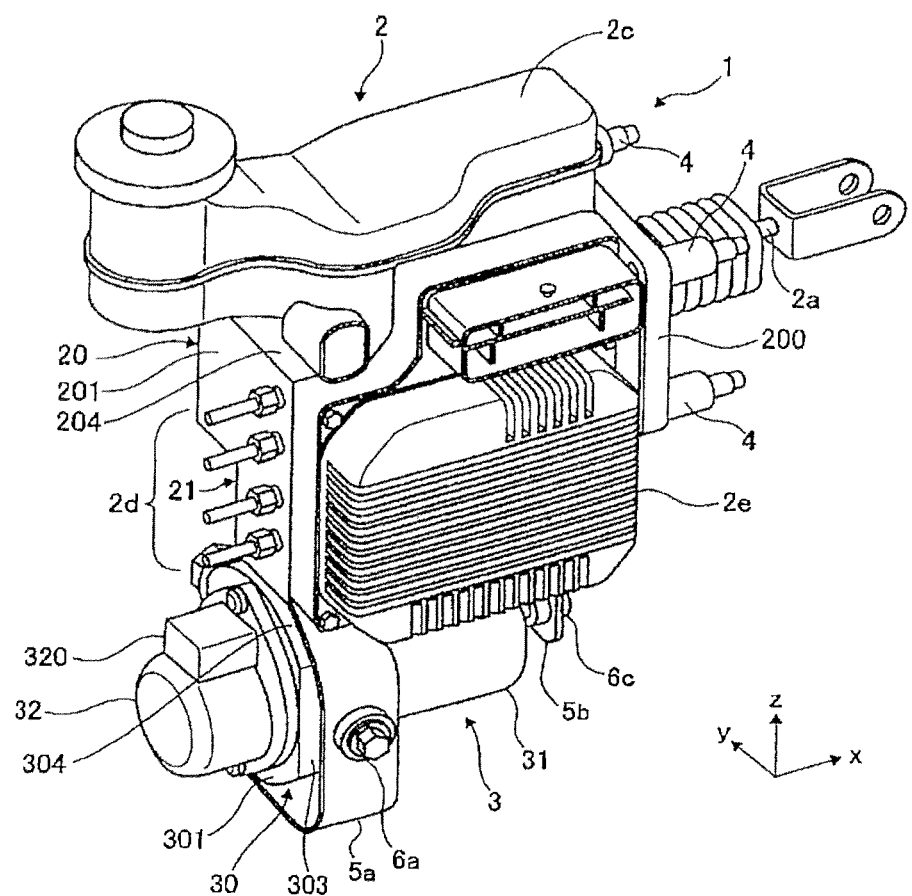
FIG. 5 is a perspective view of the brake unit according to the first embodiment.
Figure 6:
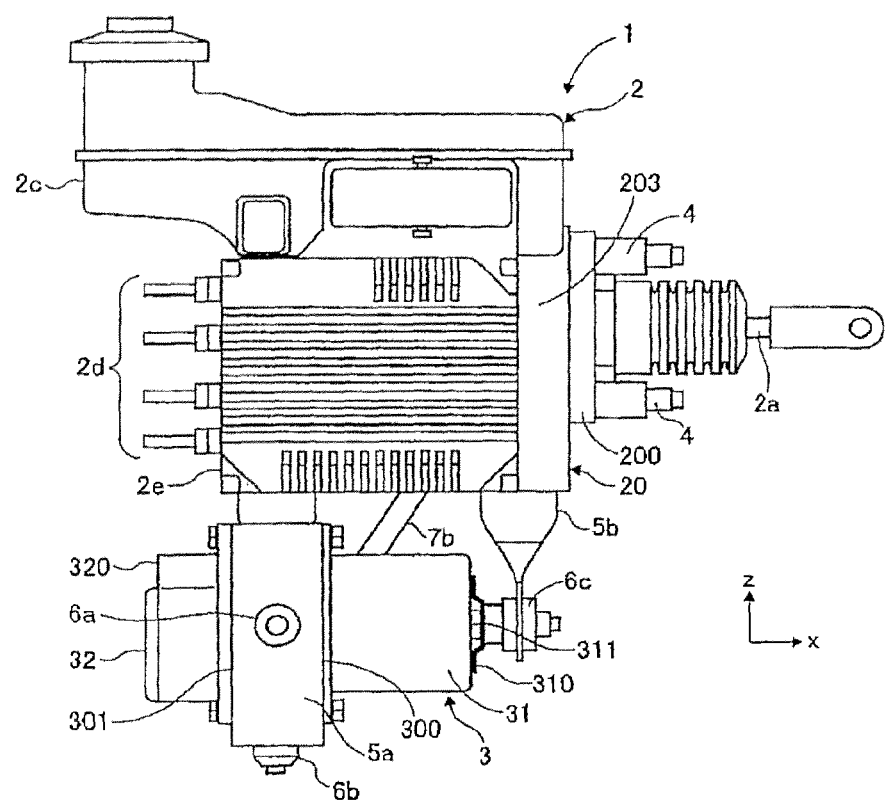
FIG. 6 is a side view of the brake unit according to the first embodiment.

The brake unit 1 includes a master cylinder unit 2 which includes the master cylinder 2b, and which is fixed to a vehicle body, and a pump unit 3 including a pump. These master cylinder unit 2 and the pump unit 3 are provided as different units. Moreover, these master cylinder unit 2 and pump unit 3 are integrally provided with each other so as to constitute a single brake unit 1. FIG. 1 to FIG. 6 are views showing an entire of the brake unit 1 according to this embodiment when viewed in respective directions. Hereinafter, for simplifying illustrations, an orthogonal coordinates is set. An x-axis is provided in an axial direction in which the master cylinder 2b is actuated. A positive direction is a side on which the brake pedal is connected to the master cylinder 2b (the brake unit 1). When the brake unit 1 is set on the vehicle, the axial direction of the master cylinder 2b becomes parallel with forward and rearward directions of the vehicle. Accordingly, the x-axis direction is the forward and rearward directions of the vehicle. The x-axis positive direction is the rear side of the vehicle (the vehicle interior's side on which the brake pedal is disposed). The x-axis negative direction is the forward side of the vehicle (the engine room's side on which the brake unit 1 is disposed). A z-axis is provided in upward and downward directions of the vehicle (vertical direction). A positive direction of the z-axis is a side (vertical upward direction) on which the reservoir tank 2c is disposed to the master cylinder 2b. A y-axis is provided in a widthwise direction (horizontal direction) of the vehicle. A positive direction of the y-axis is a right side when viewed from the x-axis positive direction side (the inside of the vehicle interior) (a negative direction of the y-axis is a side on which the control unit 2e is disposed). FIG. 1 is a perspective view showing the brake unit 1 when viewed from the obliquely direction of the x-axis negative direction side, the y-axis positive direction side, and the z-axis positive direction side. FIG. 2 is a side view showing the brake unit 1 when viewed from the y-axis positive direction side. FIG. 3 is an upper view showing the brake unit 1 when viewed from the z-axis positive direction side. FIG. 4 is a front view showing the brake unit 1 when viewed from the x-axis negative direction side. FIG. 5 is a perspective view showing the brake unit 1 when viewed from the obliquely direction of the x-axis negative direction side, the y-axis negative direction side, and the z-axis positive direction side. FIG. 6 is a side view showing the brake unit 1 when viewed from the y-axis negative direction side.

The master cylinder unit 2 includes a first housing 20 made from aluminum series metal material and so on. The first housing 20 has a shape in which a corner portion of one side of a rectangular parallelepiped is cut out. The first housing 20 includes a plate-shaped flange portion 200 (mounting portion) which extends (spreads) in substantially parallel with the y-z plane, and which is located on the x-axis positive direction side; a surface 201 which is on the x-axis negative direction side, and which extends in substantially parallel with the flange portion 200; a surface 202 which is on the y-axis positive direction side, and which extends in substantially parallel with the x-z plane; a surface 203 which is on the y-axis negative direction side, and which extends in substantially parallel with the surface 202; a surface 204 which is on the z-axis positive direction side, and which extends in substantially parallel with the x-y plane; a surface 205 which is on the z-axis negative direction side, and which extends in substantially parallel with the surface 204. The first housing 20 includes a recessed portion (stepped portion) 21 which has a shape that is cut out at a substantially right angle, and which is located between the surface 202 of the y-axis positive direction side and the surface 205 of the z-axis negative direction side. The recessed portion 21 includes a plane 210 which extends in substantially parallel with the x-z plane; and a surface 211 which extends in substantially parallel with the x-y plane. The flange portion 200 has a substantially rectangular shape when viewed from the x-axis direction. The flange portion 200 includes stud shafts 4 which are provided at four corners of the flange portion 200. The housing 20 is fixed to a floor panel (dash panel) 8 (cf. FIG. 12) of the vehicle body by four stud shafts 4 in a rigid manner (without through elastic member). The flange portion 200 (the first housing 20) is fixed to the floor panel 8 at four retaining points to form a slight x-axis direction clearance between the flange portion 200 and the floor panel 8 by spacers of the stud shafts 4. The floor panel 8 constitutes a unit mounting surface on which the master cylinder unit 2 (the brake unit 1) is mounted to the vehicle.

The first housing 20 is provided with a rod 2a to protrude from the flange portion 200 in the x-axis positive direction. The rod 2a includes an x-axis negative direction end abutted on a piston of the master cylinder 2b which is received within the first housing 20; and an x-axis positive direction end connected to the brake pedal. The master cylinder 2b is connected through the rod 2a with the brake pedal. The master cylinder 2b is a tandem type. The master cylinder 2b includes two pistons; and two hydraulic pressure chambers which are separated by these pistons. The pistons of the master cylinders 2b are received within the first housing 20 to be reciprocated in the x-axis direction. The pistons of the master cylinder 2b are arranged to generate hydraulic pressures (master cylinder pressures) corresponding to an operation force by the brake pedal, in the corresponding hydraulic pressure chambers. Each of the stud shafts 4 is provided to extend in the axial direction (the x-axis direction) in which the piston is moved, that is, in which the master cylinder 2b is actuated. The master cylinder unit 2 is provided integrally with a reservoir tank 2c which is a fluid source storing the brake fluid as the operation fluid. The hydraulic pressure chambers of the master cylinder 2b receive the supply of the brake fluid from the reservoir tank 2c. The reservoir tank 2c is mounted on the surface 204 of the first housing 20 on the z-axis positive direction side. A plurality of fluid passages for the brake fluid are formed within the first housing 20. These fluid passages are connected with the hydraulic pressure chambers of the master cylinder 2b. These fluid passages are connected through connection pipes (not shown) to the wheel cylinders.

A plurality of electromagnetic valves 2d (four in this embodiment) are mounted to the first housing 20. That is, the master cylinder unit 2 is a valve unit in which the master cylinder 2b is installed. The electromagnetic valves 2d are received within the first housing 20. Each of the electromagnetic valves 2d is a solenoid valve including a valve element which is received within the first housing 20, and which is arranged to be reciprocated to switch the flow passages (connect and disconnect); and a solenoid portion which is arranged to generate an electromagnetic force by being applied with a driving current, and to reciprocate the valve element. The solenoid portion is mounted to protrude from the surface 201 on the x-axis negative direction side of the first housing 20 in the x-axis negative direction. That is, the surface 201 constitutes a valve mounting surface on which the electromagnetic valves 2d (the solenoid portions) are mounted. The plurality of electromagnetic valves 2d are arranged in a row in the z-axis direction on the y-axis negative direction side of the surface 201. The control unit 2e is integrally fixed on the first housing 20. The control unit 2e is an electric control unit ECU configured to control the operations of the electromagnetic valves 2d and the motor 31 (the pump). The master cylinder unit 2 is an electric and mechanical integral unit. The control unit 2e is mounted on the surface 203 on the y-axis negative direction side of the first housing 20. That is, the surface 203 constitutes a control unit mounting surface.

Two pipe mounting portions 206 are provided on the surface 202 on the y-axis positive direction side which is opposite to the surface 203 of the first housing 20, on the z-axis negative direction side, on the x-axis positive direction side and the x-axis negative direction side. One ends of connection pipes 7 (two pipes 7a and 7b in this embodiment) which are brake pipes connecting the master to cylinder unit 2 and the pump unit 3 are mounted on the pipe mounting portions 206. That is, the surface 202 constitutes a pipe mounting surface. The surface 210 of the recessed portion 21 of the first housing 20 includes two bracket mounting portions 207 on which brackets 5 (two is brackets 5a and 5b in this embodiment) are mounted, and which are provided on the z-axis negative direction side on the x-axis positive direction side and the x-axis negative direction side. That is, the surface 210 constitutes a bracket mounting surface. One end of the bracket 5a is mounted on the bracket mounting portion 207 on the x-axis negative direction side without through a mount (by bolt fastening). One end of the bracket 5b is mounted on the bracket mounting portion 207 on the x-axis positive direction side without through a mount (by bolt fastening).

The pump unit 3 includes a second housing 30 made from aluminum series metal material and so on. A pump is installed in the second housing 30. The pump is a rotary type. In this embodiment, a gear pump which has a good silence characteristic is used. For example, it is possible to use an external gear pump. Besides, the pump is not limited to this. It is optional to use an internal gear pump. Moreover, the pump is not limited to a rotary pump. It is possible to employ a reciprocate pump such as a plunger pump. The second housing 30 is a substantially cylindrical shape. The second housing 30 has a shape in which an outer circumference portion of the cylindrical shape is cut out into a plane shape at two portions which confront to sandwich a central shaft of the cylinder. The second housing 30 includes a surface 300 which is on the x-axis positive direction side, and which extends in substantially parallel with the y-z plane; a surface 301 which is on the x-axis negative direction side, and which extends in substantially parallel with the surface 300; a surface 302 which is on the y-axis positive direction side, and which extends (in a plane shape) in substantially parallel with the x-z plane; a surface 303 which is on the y-axis negative direction side, and which extends (in the plane shape) in substantially parallel with the surface 302; a surface 304 which extends in a raised curved shape on the z-axis positive direction side of the surfaces 302 and 303; and a surface 305 which extends in a raised curved shape on the z-axis negative direction side of the surfaces 302 and 303.

The surface 302 of the y-axis positive direction side of the second housing 30 includes two pipe mounting portions 306 on which the other ends of the connection pipes 7 are mounted, and which are located on the z-axis positive direction side and the z-axis negative direction side. That is, the surface 302 constitutes a pipe mounting surface. The surface 303 of the y-axis negative direction side of the second housing 30 includes a bracket mounting portion 307 on which the bracket 5a is mounted. That is, the surface 303 constitutes a bracket mounting surface. An intermediate portion of the bracket 5a is mounted through a mount 6a on the bracket mounting portion 307. On the surface 305 of the second housing 30 on the z-axis negative direction side, there is provided a bracket mounting portion 307 on which the bracket 5a is mounted. That is, the surface 305 constitutes a bracket mounting surface. The other end of the bracket 5a is mounted through a mount 6b on the bracket mounting portion 307. A pump cover 32 is mounted on the surface 301 which is on the x-axis negative direction side of the second housing 30. In particular, the flange portion which is on the x-axis positive direction side is mounted on the surface 301 of the second housing 30 by the plurality of (for example, two) bolts. With this, the pump cover is integrally fixed on the pump unit 3. The pump cover 32 is provided with a connector 320 for connecting lines for supplying a driving current to the motor 31.

The motor 31 is controlled by the control unit 2e. The motor 31 rotationally drives a rotational shaft of the pump. The motor 31 is a direct current brush motor. The motor 31 is not limited to this. The motor 31 is mounted on the surface 300 on the x-axis positive direction side of the second housing 30. In particular, the motor 31 includes a flange portion which is on the x-axis negative direction side (an opening portion) of a bottomed cylindrical case of the motor 31, and which is tightened on the surface 300 of the second housing 30 by a plurality of (for example, two) bolts. With this, the motor 31 is integrally fixed with the pump unit 3. A central axis of the motor 31 (the case) is provided in substantially identical line of the central axis of the second housing 30. The surface 310 of the motor 31 (the case) on the x-axis positive direction side is disposed to extend in substantially parallel with the y-z plane. At a substantially central portion of this surface 310 (on the central shaft of the motor 31), there is provided a bracket mounting portion 311 to which the bracket 5b is mounted. That is, the surface 310 constitutes a bracket mounting surface. The other end of the bracket 5b is mounted through a mount 6c on the bracket mounting portion 311.

The first housing 20 and the second housing 30 are connected so that the brake fluid flows through the connection pipes 7. The connection pipes 7 are not steel pipes. The connection pipes 7 are flexible pipes. The pump is arranged to be driven by the motor 31, and to suck the brake fluid from the flow passages within the first housing 20 through the connection pipes 7. Moreover, the pump is arranged to discharge the high pressure brake fluid through the connection pipes 7 to the flow passages within the first housing 20. The brake unit 1 is arranged to increase the wheel cylinder pressure by using this discharge pressure.

Figure 7:
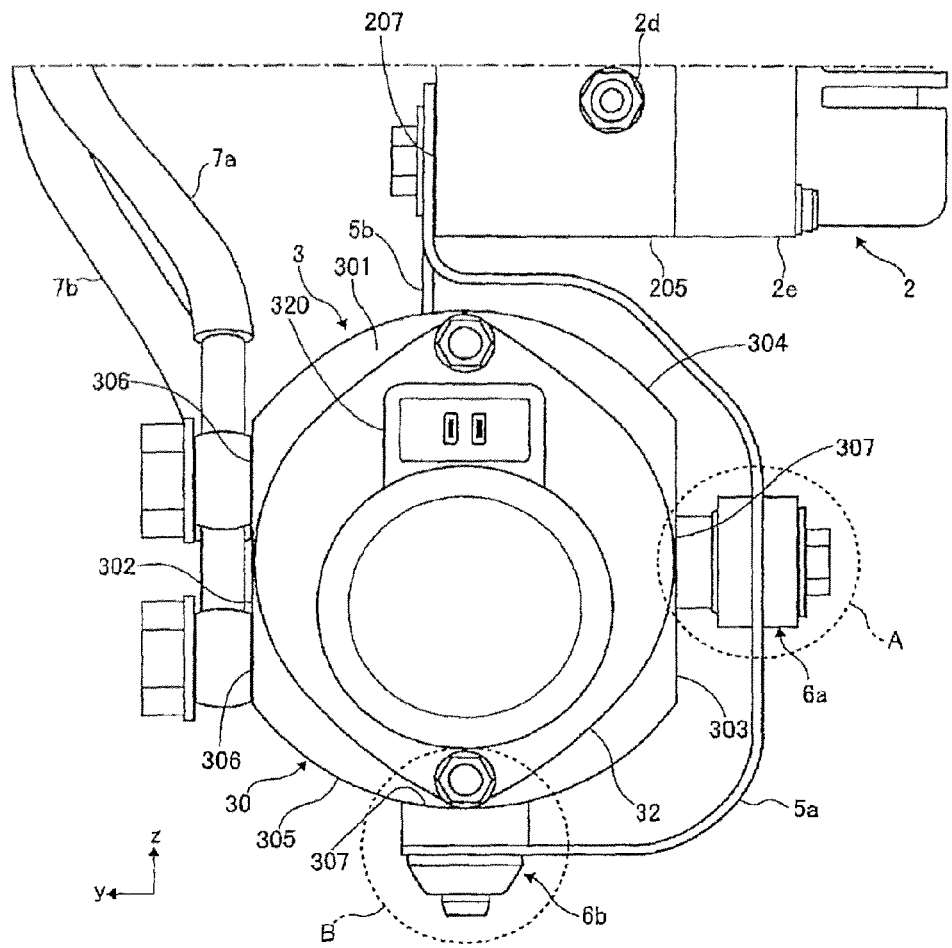
FIG. 7 is an enlarged view including a portion including a pump unit of FIG. 4.

Next, a mounting structure between the master cylinder unit 2 and the pump unit 3 is illustrated. The first housing 20 and the second housing 30 are integrated by the bracket 5a. That is, the first housing 20 and the second housing 30 are connected through the bracket 5a. With this, the units 2 and 3 are integrally fixed with each other. FIG. 7 is an enlarged view showing a portion including the pump unit 3 of FIG. 4. The bracket 5a extends in a belt shape to have a predetermined x-axis direction width. Moreover, the bracket 5a has a shape which is bent to inflate (rise) in the y-axis positive direction when viewed from the x-axis negative direction side. The width of the x-axis direction of the bracket 5a is substantially identical to the width of the x-axis direction of the second housing 30 of the pump unit 3, or is slightly smaller than the width of the x-axis direction of the second housing 30 of the pump unit 3. The bracket 5a is provided to surround the second housing 30. In particular, the bracket 5a is curved to cover a substantially half portion of the second housing 30 on the y-axis negative direction side when viewed from the x-axis negative direction side. The bracket 5a includes a portion which extends in substantially parallel with the x-z plane, which confronts the bracket mounting surface 303 of the second housing 30, and which is mounted to the bracket mounting portion 307. The bracket 5a includes a portion which extends in substantially parallel with the x-y plane, which confronts the bracket mounting surface 305 of the second housing 30, and which is mounted on the bracket mounting portion 307. That is, the bracket 5a supports the second housing 30 in the two different directions (the y-axis direction and the z-axis direction).

Figure 8:
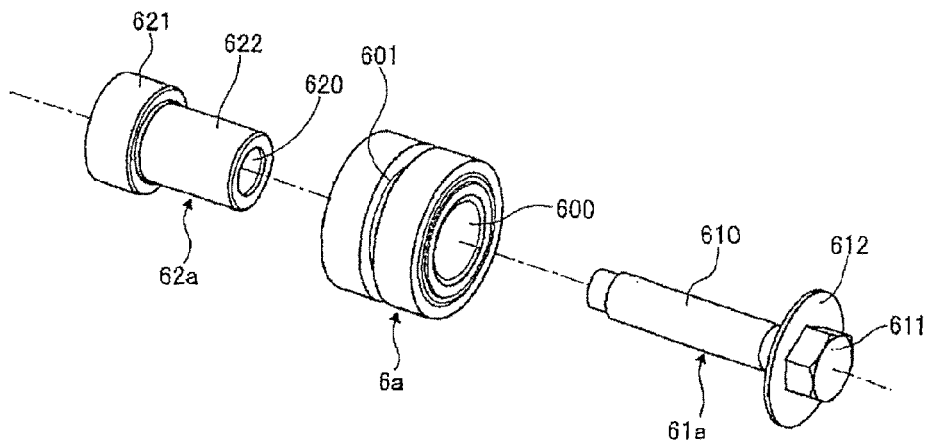
FIG. 8 is an exploded perspective view of a bracket mounting component in a portion A of FIG. 7.
Figure 9:
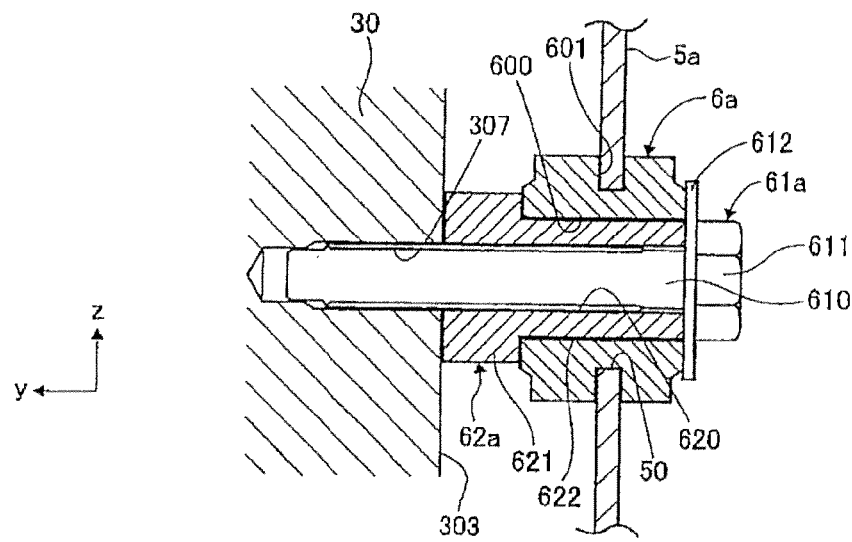
FIG. 9 is a partially sectional view of the bracket mounting component in the portion A of FIG. 7.

FIG. 8 is a perspective view in which mounting components of the bracket 5a including the mount 6a are exploded and coaxially arranged. The mounting components include a bolt 61a and a support member 62a, in addition to the mount 6a. The bolt 61a includes a screw portion 610, a hexagonal head portion 611, and a flange portion 612. The support member 62a is a hollow cylindrical member which has a hole 620 that penetrates through the support member 62a, that has a diameter different from the diameter of the screw portion 610 of the bolt 61a, and that has the diameter larger than the diameter of the screw portion 610 of the bolt 61a. The large diameter portion 610 and the small diameter portion 622 are disposed coaxially with each other. The mount 6a is a hollow cylindrical shape which has a hole 600 which penetrates through the mount 6a, and which has a diameter substantially identical to the diameter of the small diameter portion 622 of the support member 62a. The mount 6a is an elastic member made from elastic material such as a rubber. The mount 6a includes an annular groove 601 which is formed on an outer circumference surface of a substantially axial central portion of the mount 6a, and which is formed around the axis of the mount 6a. The mount 6a has an axial size which is substantially identical to an axial size of the small diameter portion 622 of the support member 62a, or slightly larger than the axial size of the omen diameter portion 622 of the support member 62a. FIG. 9 shows a mounting structure of the bracket 5a through the mount 6a to the second housing 30, in a portion A of FIG. 7. FIG. 9 is a partial sectional view taken along a plane including an axis of the mounting components of the bracket 5a. The bracket 5a includes a hole 50 which is formed at a portion confronting the bracket mounting surface 303 of the second housing 30. The mount 6a includes a groove 601 which is arranged to be mounted in the outer circumference of the hole 50 of the bracket 5a, and to sandwich and support the bracket 5a. That is, the groove 601 is a bracket support groove. The screw portion 610 of the bolt 61a is inserted in the hole 620 of the support member 62a on the inner circumference side, in a state where the hole 600 of the mount 6a on the inner circumference side is mounted on the small diameter portion 622 of the support member 62a. A tip end side of the screw portion 610 is screwed in an internal screw formed in the bracket mounting portion 307 of the second housing 30. The mount 6a is sandwiched and fixed between the small diameter portion 622 of the support member 62a and the flange portion 612 of the bolt 61a. The large diameter portion 621 serves as a spacer arranged to adjust a height of the mount 6a.

Figure 10:
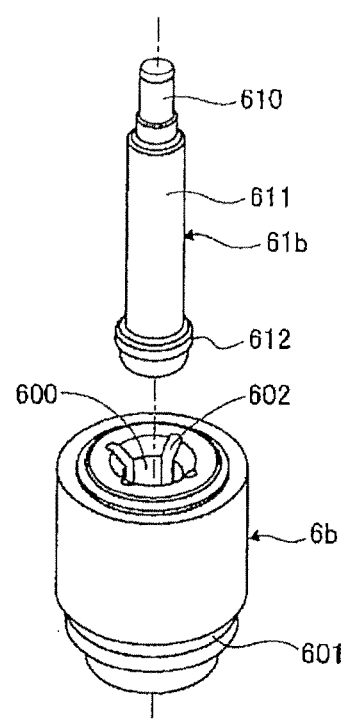
FIG. 10 is an exploded perspective view of the bracket mounting portion in a portion B of FIG. 7.
Figure 11:
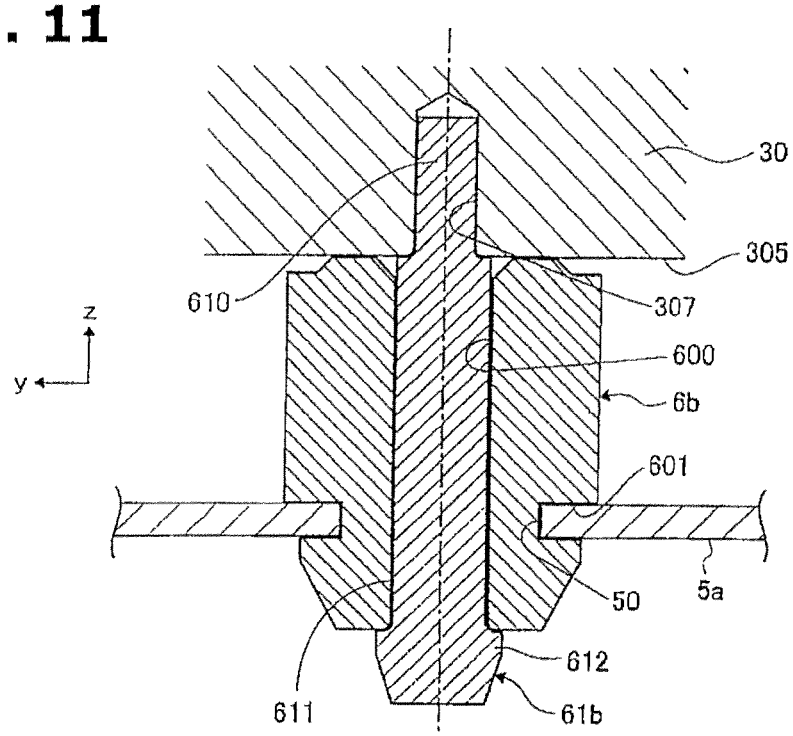
FIG. 11 is a partially sectional view of the bracket mounting component in the portion B of FIG. 7.

FIG. 10 is a perspective view in which the mounting components of the bracket 5a including the mount 6b are exploded and coaxially arranged. The mounting components include a bolt 61b, in addition to the mount 6b. The bolt 61b includes a press-fit portion 610, a support portion 611 which has a diameter larger than that of the press-fit portion 610, and a head portion 611. The mount 6b is a hollow cylindrical shape which includes a hole 600 that penetrates through the mount 6b, and which has a diameter substantially identical to a diameter of the support portion 611 of the bolt 61b. The mount 6b is an elastic member made from elastic material such as a rubber. The hole 600 includes a plurality of recessed portions 602 which are formed on the inner circumference surface by being cut out on the inner circumference surface, and which extend in the axial direction. On an outer circumference surface on the axially one side of the mount 6b, there are provided an annular groove 601 which is formed around the axis of the mount 6b. The mount 6b has an axial size which is substantially identical to an axial size of the support portion 611 of the bolt 61b, or is slightly greater than the axial size of the support portion 611 of the bolt 61b. FIG. 11 shows a mounting structure of the bracket 5a through the mount 6b to the second housing 30, in a portion B of FIG. 7. FIG. 11 is a sectional view taken along a plane including the axes of the mounting components of the bracket 5a. The bracket 5a includes a hole 50 which is formed at a portion confronting the bracket mounting surface 305 of the second housing 30. The groove 601 of the mount 6b is mounted on this outer circumference of the hole 50 of the bracket 5a. With this, the mount 6b sandwiches and supports the bracket 5a. That is, the groove 601 is a bracket support hole. The press-fit portion 610 on the tip end side of the bolt 61b is press-fit in the hole formed in the bracket mounting portion 307 of the second housing 30, in a state where the hole on the inner circumference side of the mount 6b is mounted on the support portion 611 of the bolt 61b.

The mount 6b is sandwiched and fixed between the bracket mounting surface 305 of the second housing 30 and the head portion 611 of the bolt 61a.

The second housing 30 is connected through the bracket 5a to the first housing 20. Moreover, the motor 31 is connected through the bracket 5b to the first housing 20. That is, the pump unit 3 is fixed to the first housing 20 at two points of the second housing 30 and the motor 31. The bracket 2b has a shape in which a member extending in the band (belt) shape to have a predetermined width is twisted around the extending direction of the member at a substantially 90 degrees. That is, the bracket 2b includes a portion (one end) which extends in substantially parallel to the x-z plane like the bracket 5a, and a portion (the other end) which extends in substantially parallel to the y-z plane unlike the bracket 5a. The former portion (the one end) is mounted to the bracket mounting portion 207 of the first housing 20. The latter portion (the other end) confronts the surface 310 of the motor 31 on the x-axis positive direction side. The bracket 2b is mounted through the mount 6c to the bracket mounting portion 311. In this way, the second housing 30 is fixed on the surface (the first surface) of the bracket 5a which extends in the x-axis direction. On the other hand, the motor 31 is fixed on the portion (a second surface) of the bracket 5b which extends in substantially parallel to the y-z plane to be perpendicular to this first surface. That is, the bracket 5a and 5b support the pump unit 3 in the different directions (the x-axis direction, and the direction perpendicular to the x-axis direction).

The mount 6c has a structure identical to that of the mount 6a. The mounting structure of the bracket 5b through the mount 6c to the motor 31 is identical to the mounting structure of the bracket 5a through the mount 6a to the second housing 30. The axes of the mounting components (the bolts 61a and the support members 62a) including the mount 6c are provided to extend in the x-axis direction. That is, the axes of the mounting components (the bolts 61a and the support members 62a) including the mount 6c are provided in substantially parallel to the shaft of the motor 31. In particular, the shafts of the mounting components (the bolts 61a and the support members 62a) are provided to extend substantially coaxially with the shaft of the motor 31. The central axis of the cylindrical second housing 30 is disposed to extend in the x-axis direction. The central shaft axis of the cylindrical housing 30 is in substantially parallel with the rotation shaft of the pump. The axial (line) direction in which the master cylinder 2b is actuated, and the axial (line) direction of the rotation shaft of the pump are the same direction (the x-axis direction). A direction in which the rotation shaft of the motor 31 extends is the x-axis direction. The direction in which the rotation shaft of the motor 31 extends is a direction toward the unit mounting surface (the floor panel 8) on which the master cylinder unit 2 is mounted on the vehicle. Moreover, the axial (line) direction of the rotation axis of the pump extends along the direction (the x-axis direction) of the stud shafts 4.

Next, the disposition of the master cylinder unit 2 and the pump unit 3 is illustrated. In this embodiment, the pump unit 3 is disposed on the lower side of the master cylinder unit 2. When viewed from the z-axis direction, the pump unit 3 is integrally fixed on the master cylinder unit 2 so as to confront the surface 205 of the first housing 20 which is the lower surface (the z-axis negative direction side) of the master cylinder unit 2 when the master cylinder unit 2 is mounted to the vehicle (that is, so as to be disposed on the lower surface side of the master cylinder unit 2). The master cylinder unit 2 and the pump unit 3 are disposed so that a y-axis direction distance between the surface 202 of the first housing 20 on the y-axis positive direction side and the surface 302 of the second housing 30 on the y-axis positive direction side becomes small as much as possible (in this embodiment, becomes substantially zero) when viewed in the y-axis direction. The master cylinder unit 2 and the pump unit 3 are disposed so that a y-axis direction distance between the surface 203 of the first housing 20 on the y-axis negative direction side, and the surface 303 of the second housing 30 on the y-axis negative direction side becomes small as much as possible (in this embodiment, becomes substantially zero). That is, the second housing 30 is cut out into the plane shapes at two portions on the y-axis both direction sides so that the y-axis direction size of the second housing 30 becomes substantially identical to the y-axis direction size of the first housing 20. The second housing 30 is integrated with the first housing 20 so that this cut-out portion (surfaces 302 and 303) are substantially flush with the side surfaces 202 and 203 of the first housing 20 (the second housing 30 is positioned directly below the first housing 20) (FIG. 4). When viewed in the x-axis direction, the surface 310 of the motor 31 (the case) on the x-axis positive direction side is disposed on the x-axis negative direction side of the surface (the flange portion 200) of the first housing 20 on the x-axis positive direction side. That is, there is provided a predetermined x-axis direction clearance between the surface 310 of the motor 31 and the flange portion 200 of the first housing 20. In this clearance, the bracket 5b is disposed. An x-axis direction distance between the surface 201 of the first housing 20 on the x-axis negative direction side and the surface 301 of the second housing 30 on the x-axis negative direction side is small. The surface 301 is positioned slightly on the x-axis positive direction side of the surface 201.

By the above-described dispositions in the respective directions, when the brake unit 3 is viewed from the z-axis positive direction side as shown in FIG. 3, the second housing 30 of the pump unit 3 (including the motor 31) cannot be viewed behind the first housing 20 of the master cylinder unit 2. Moreover, the x-axis negative direction ends of the electromagnetic valves protruding from the surface 201 of the first housing 20, and the x-axis negative direction end of the pump cover 32 protruding from the surface 301 of the second housing 30 are positioned at substantially identical x-axis direction position. The x-axis negative direction ends of the electromagnetic valves protruding from the surface 201 of the first housing 20, and the x-axis negative direction end of the pump cover 32 protruding from the surface 301 of the second housing 30 are disposed on the x-axis positive direction side of the x-axis negative direction end of the reservoir tank 2c. When the brake unit 1 is viewed from the z-axis positive direction side, a most part of the pump cover 32 is covered with the reservoir tank 32 (protruding from the x-axis negative direction side of the first housing 20). Moreover, the head portion 611 of the bolt 61a for mounting the bracket 5a on the bracket mounting surface 303 of the second housing 30 on the y-axis negative direction side is positioned on the y-axis positive direction side of the y-axis negative direction end surface of the control unit 2e. Accordingly, when the brake unit 1 is viewed from the z-axis positive direction side, the bracket 5a is not viewed behind the control unit 2e. Moreover, the pipe mounting surface 202 of the first housing 20 and the pipe mounting surface 302 of the second housing 30 are provided on the same y-axis positive direction side. Furthermore, when the entire of the brake unit 1 is viewed as a rectangular parallelepiped, the valve mounting surface 203 of the first housing 20 and the connector 320 of the pump cover 32 are provided on the surface 201 and the surface 203 (which extends in substantially parallel with the y-z plane) which are adjacent to the control unit mounting surface 203 of the first housing 20 (which extends in substantially parallel with the x-z plane), not on the surface 202 and the surface 302 which are positioned (confronts) at an opposite position of the control unit mounting surface 203 of the first housing 20 in the y-axis direction.

Functions of First Embodiment

Next, functions of the brake unit 1 are illustrated. Conventionally, there is known a brake device including a brake control unit which is arranged to generate a control hydraulic pressure by using a pump independently of the brake operation of the driver. In this embodiment, this brake control unit is integrated with the master cylinder 2b to constitute one brake unit 1. Accordingly, it is possible to ease the handling, and to improve the mountability on the vehicle. That is, the entire of the main parts of the brake system are collectively constituted as the brake unit 1. Consequently, the mountability on the vehicle becomes good. In particular, the brake control unit is arranged to generate the wheel cylinder pressure higher than the master cylinder pressure, and thereby to perform the boost control to decrease the brake operation force. Therefore, it is possible to easily replace the conventional brake boost device (the mastervac). A broken line circle VB of FIG. 4 shows one example of disposition region of the conventional mastervac. That is, it is possible to dispose the brake unit 1 in the space VB which is needed for the disposition of the mastervac. Moreover, another space for disposing the brake control unit is not needed. Accordingly, it is possible to simplify the entire of the brake system. Consequently, it is possible to improve the applicability to the vehicle, and to decrease the space of the vehicle.

On the other hand, the vibration and the noise are generated at the operation of the pump (including the motor for driving the pump, hereinafter, the same apply hereafter). These become the main noise and vibration generating source of the brake control unit. When the above-described boost control is performed, the frequency of operating the pump according to the brake operation is high. Furthermore, the brake control unit and the master cylinder are integrated. With this, the brake control unit (the pump) is disposed near the master cylinder which is interlocked with the brake pedal. Accordingly, the vibration and the noise are easy to be transmitted to the brake pedal and the inside of the vehicle. In particular, when the housing of the master cylinder is directly fixed on the floor panel of the vehicle body without providing the mastervac like the present embodiment, the vibration is easy to be transmitted from the housing of the master cylinder to the inside of the vehicle. Furthermore, the influence of the vibration and the noise on the driver becomes relatively large in the vehicle having no engine like the present embodiment. Consequently, there is a request that the high silence is attained.

Contrarily, in this embodiment, the gear pump which has the silence better than the plunger pump is used as the pump. Accordingly, it is possible to improve the silence. Furthermore, the master cylinder unit 2 and the pump unit 3 are provided as independent units. In particular, there are provided the master cylinder unit 2 including the master cylinder 2b provided within the first housing 20 fixed to the vehicle body, and the pump unit 3 including the second housing 30 in which the pump which is driven by the motor 31, and arranged to increase the wheel cylinder pressure is disposed. Accordingly, it is possible to vibrationally keep (distance) the pump which is the main vibration and noise generating source from the driver (the brake pedal). In particular, the master cylinder unit 2 and the pump unit 3 are elastically integrated by the vibration proofing (absorption) member (the insulator). The vibration proofing member is a vibration suppression (damping) member which elastically supports the pump unit 3 that generates the vibration. In this embodiment, the vibration proofing member is the mount 6 constituted by an elastic member such as a rubber. Besides, the elastic member may be a metal spring and so on. In this way, the master cylinder unit 2 and the pump unit 3 are integrally fixed through the soft (flexible) mount. Accordingly, it is possible to absorb the vibration at the pump operation by the mount 6, and to suppress the transmission of the vibration from the pump unit 3 to the master cylinder unit 2 (that is, to the brake pedal and the vehicle interior).

Figure 12:
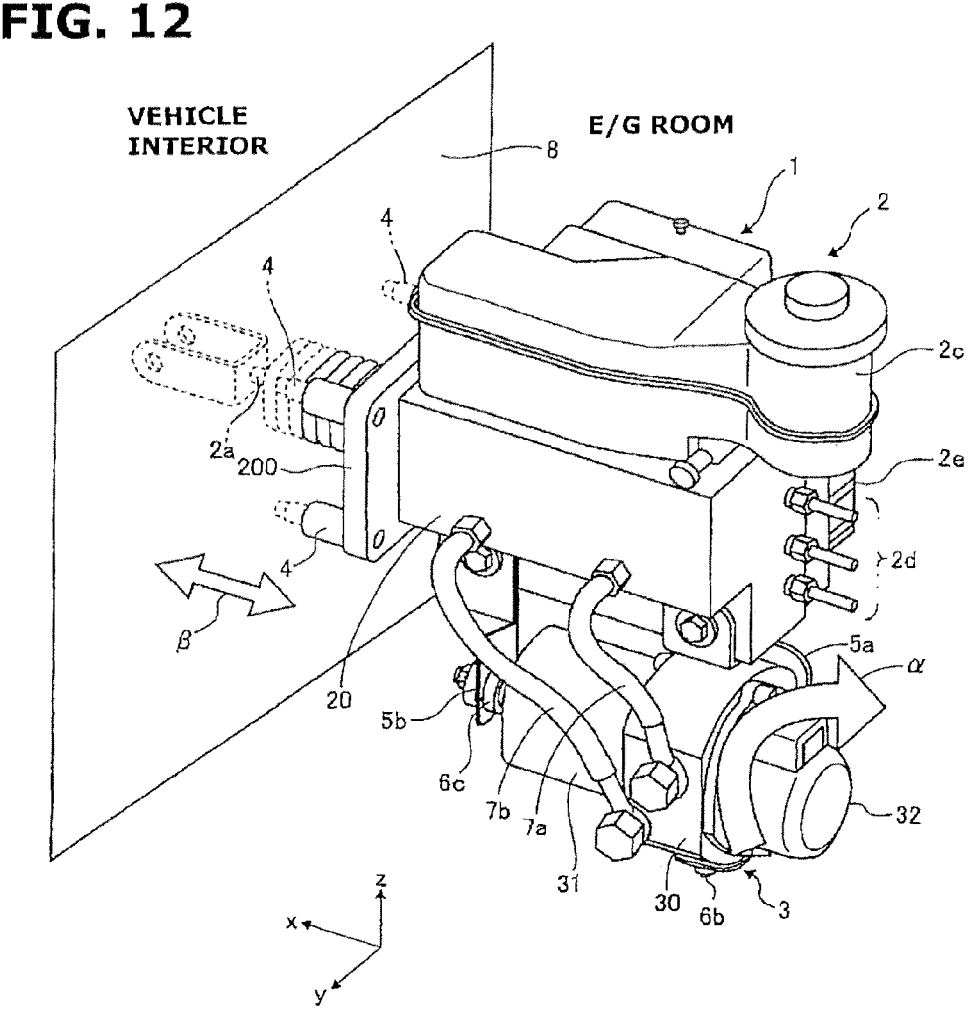
FIG. 12 is a perspective view showing a mounting state in which the brake unit according to the first embodiment is mounted to the vehicle.

In particular, the brake unit 1 is disposed inside the engine room of the vehicle, as shown in FIG. 1 and FIG. 12 which are the similar perspective view. The engine room (compartment) and the vehicle interior are defined by the floor panel 8 of the vehicle body. The first housing 20 of the master cylinder unit 2 is fixed on the floor panel 8 by the stud shafts 4. The rod 2a extending from the first housing 20 (the master cylinder 2b) in the x-axis positive direction side is disposed within the vehicle interior, and connected to the brake pedal. The first housing 20 is rigidly fixed on the floor panel 8 (without through the elastic member) so as to generate the reaction force with respect to the brake operation force (the depression force) of the driver which is inputted to the brake pedal (the rod 2a) (that is, so as to appropriately transmit the brake operation force to the piston of the master cylinder 2b, and to generate the master cylinder pressure according to the brake operation force). On the other hand, when the second housing 30 of the pump unit 3 is directly fixed on the vehicle body's side, for example, the floor panel 8, the vibration of the pump may be transmitted through the floor panel 8 to the vehicle interior. When the pump unit 3 (the second housing 30) is rigidly fixed on the master cylinder unit 2 (the first housing 20), the same is caused. Contrarily, in this embodiment, the second housing 30 of the pump unit 3 is not directly fixed on the vehicle body's side. The second housing 30 of the pump unit 3 is fixed through the mounts 6a and 6b to the master cylinder unit 2 (the first housing 20). Accordingly, it is possible to suppress the transmission of the vibration to the vehicle body's side (the brake pedal and the vehicle interior) at the operation of the pump. Similarly, the motor 31 is not directly fixed on the vehicle body's side. The motor 31 is fixed through the mount 6c on the master cylinder unit 2. Accordingly, it is possible to suppress the transmission of the vibration of the motor 31 to the vehicle body's side.

Moreover, the master cylinder unit 2 and the pump unit 3 are different (independent) units. Accordingly, the brake pipes (the connection pipes 7) connecting the both units 2 and 3 are needed. If the connection pipes 7 are the steel pipe, the pressure pulse (pulsation) and the vibration of the pump are easy to be transmitted through the connection pipes 7 to the master cylinder unit 2 (the first housing 20). Accordingly, in this embodiment, the connection pipe are made from the flexible material. Consequently, in this embodiment, it is possible to improve the layout characteristic, and also to suppress the transmission of the vibration from the pump unit 3 to the master cylinder unit 2. Besides, the pipe mounting surface 202 of the master cylinder unit 2 (the first housing 20) and the pipe mounting surface 302 of the pump unit 3 (the second housing 30) are provided on the same y-axis positive direction side. With this, it is possible to decrease the lengths of the connection pipes 7, and also to improve the connection operation and the arrangement characteristic of the connection pipes 7.

Besides, the master cylinder unit 2 (the first housing 20) and the pump unit 3 (the second housing 30 and the motor 31) may be integrated only through the mount 6 without through the bracket 5 (that is, the mounts 6 are used as the connection member). In this case, for example, the mounts 6 are constituted to be directly engaged with the pump unit 3 or the master cylinder unit 2. In this embodiment, the first housing 20 and the second housing 30 are integrated by the bracket 5 (integrally disposed, disposed as a unit with each other). That is, the first housing 20 and the second housing 30 (and the motor 31) are connected through the bracket 5. With this, the both units 3 and 4 are integrally fixed. By using the bracket 5 in this way, it is possible to improve the freedom of the layout when the both units are integrated. Moreover, the motor 31 is mounted to the second housing 30. The second housing 30 and the motor 31 are connected through the brackets 5a and 5b to the first housing 20. In this way, the pump unit 3 is fixed to the first housing 20 at the two points of the second housing 30 and the motor 31. Accordingly, it is possible to improve the fixation strength.

The brackets 5a and 5b are provided to surround the pump unit 3 (including the motor 31). The second housing 30 is fixed on the surface (the first surface) of the bracket 5a which extends in the x-axis direction. The motor 31 is fixed to a portion (a second surface) of the bracket 5b which extends in substantially parallel with the y-z plane so as to be perpendicular to the first surface. In this way, the pump unit 3 (including the motor 31) is supported in the two different directions (the x-axis direction and a direction perpendicular to the x-axis direction). With this, it is possible to more rigidly fix the pump unit 3 and the master cylinder unit 2, and to improve the fixation strength. Furthermore, the bracket 5a is provided to surround the second housing 30. The second housing 30 is fixed to the portion of the bracket 5a which extends in substantially parallel with the x-z plane. Moreover, the second housing 30 is fixed to the portion of the bracket 5a which extends in substantially parallel to the x-y plane. In this way, the second housing 30 is supported in the two different directions (the y-axis direction and the z-axis direction). With this, it is possible to improve the fixation strength between the pump unit 3 and the master cylinder unit 2.

Besides, the pump unit 3 and the bracket 5 may be rigidly fixed, and the bracket 5a and the master cylinder unit 2 may be mounted through the mount. When the mount is provided in this way in the connection portion between the first housing 20 and the bracket 5a, it is possible to suppress the transmission of the vibration from the pump unit 3 (the second housing 30) to the master cylinder unit 2 (the first housing 20) by the absorption effect of the mount, like this embodiment in which the mounts 6a and 6b are provided in the connection portion between the second housing 30 and the bracket 5a. In this embodiment, the mounts 6a and 6b are not provided between the first housing 20 and the bracket 5a. The mounts 6a and 6b are provided between the second housing 30 and the bracket 5a. In this way, the mounts 6a and 6b are provided at a position before the bracket 5a when viewed from the pump unit 3, that is, provided at a position nearer the pump (the second housing 30) which is the driving source. Accordingly, it is possible to improve the effect of the suppression of the transmission of the vibration to the master cylinder unit 2. The above-described matter same applies to the disposition of the mount 6c provided to the bracket 5b connecting the motor 31 to the first housing 20.

Figure 13:
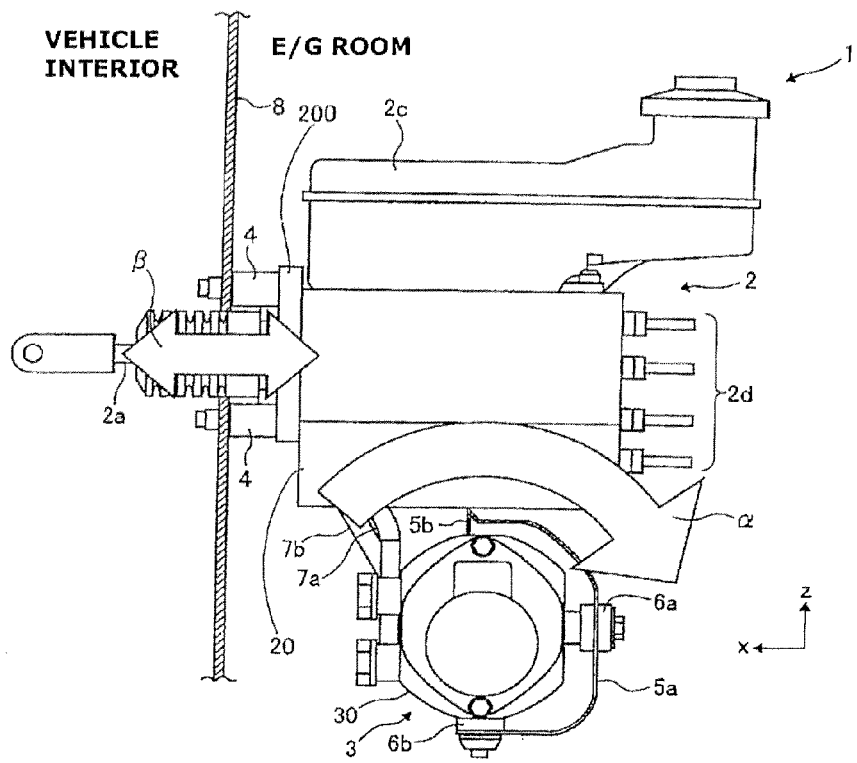
FIG. 13 is a side view showing a mounting state in which a brake unit of a comparative example is mounted to the vehicle.
Figure 14:
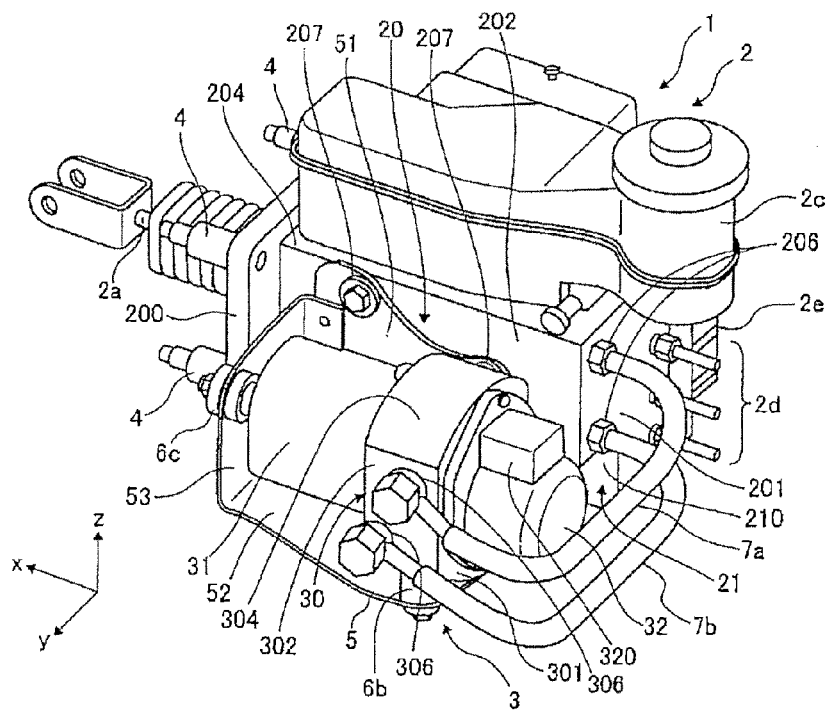
FIG. 14 is a perspective view of a brake unit according to a second embodiment.

(An axial direction of) The rotation shaft of the motor 31 is a direction (the x-axis direction) directing toward the mounting surface (the floor panel 8) on which the master cylinder unit 2 is mounted to the vehicle. Accordingly, it is possible to suppress the transmission of the vibration and the noise due to the operation of the motor 31 to the vehicle body's side. Hereinafter, it is explained with reference to FIG. 12 and FIG. 13. FIG. 13 shows a side surface of a comparative example in which the rotation shaft of the motor 31 is provided to be perpendicular to the x-axis (in the y-axis direction). The rotation reaction force is acted to the motor case and so on which supports the rotation shaft of the motor 31, in accordance with the rotation action (of the rotor) of the motor 31 (arrows α, in FIGS. 12 and 13). This rotation reaction force is transmitted through the brackets 5a and 5b to the first housing 20 of the master cylinder unit 2. Moreover, this rotation reaction force is transmitted through the flange portion 200 of the first housing 20 (the four retaining points of the first housing 20 by the stud shafts 4) to the floor panel 8. The direction in which the rotation reaction force is acted to the first housing 20 (the floor panel 8) is a direction around the rotation shaft of the motor 31. This direction around the rotation shaft is the vibration direction of the motor 31. In this case, when the axis of the master cylinder 2b and the rotation shaft of the motor 31 are disposed at an angle (to have an angle), the direction in which the rotation reaction force of the motor 31 is acted to the master cylinder unit 2 (the floor panel 8) has an angle with respect to the floor panel 8. The component of the force (arrows 13 in FIGS. 12 and 13) in a direction perpendicular to the floor panel 8 bangs the floor panel 8 like a drum. With this, the vibration of the motor 31 is transmitted to the floor panel 8, so that the floor panel 8 is vibrated like a membrane. The master cylinder unit 2 mounted to the floor panel 8 is vibrated in a direction perpendicular to the floor panel 8 (the axial direction of the master cylinder 2b) in accordance with this vibration of the floor panel 8, so as to vibrate the brake pedal through the rod 2a. When the axis of the master cylinder 2b and the rotation shaft of the motor 31 are provided perpendicular to each other as shown in the comparative example of FIG. 13 and so on, the actuation direction of the rotation reaction force with respect to the floor panel 8 is perpendicular to the floor panel 8. That is, the magnitude of the force β which bangs the floor panel 8 on the mounting surface of the master cylinder unit 2 becomes maximum. Accordingly, the vibration of the motor 31 becomes easiest to be transmitted to the floor panel 8 and the brake pedal.

Contrarily, in this embodiment, the rotation shaft of the motor 31 is provided in a direction substantially parallel to the shaft of the master cylinder 2b, that is, a direction toward the mounting surface of the master cylinder unit 2 (the floor panel 8) (the direction of the stud shafts 4). With this, as shown in FIG. 12, the direction in which the rotation reaction force of the motor 31 is acted to the floor panel 8 (the mounting surface of the master cylinder unit 2) becomes substantially parallel to the floor panel 8. The angle with respect to the floor panel 8 becomes minimum. Consequently, the component β of the force banging the floor panel 8 becomes minimum. The vibration of the motor 31 is hardest to be transmitted to the vehicle body's side. In this way, the motor 31 is mounted in a direction in which the vibration of the motor 31 is hard to the vehicle body's side, in consideration of the vibration direction of the motor 31.

With this, it is possible to improve the suppression effect of the vibration and the noise. Moreover, the first housing 20 is fixed to the floor panel 8 by the stud shafts 4 (through the spacer) so as to form a minute (slight) x-axis direction clearance between the flange portion 200 and the floor panel 8. With this, it is possible to effectively suppress the transmission of the vibration, relative to the case in which the flange portion 200 is surface-contacted on the floor panel 8.

The first housing 20 of the master cylinder unit 2 includes the valve mounting surface 201 on which the electromagnetic valves 2*d* are mounted. The pump unit 3 is integrally fixed to confront the surface 205 other than the valve mounting surface 201 of the first housing 20. Accordingly, it is possible to avoid the interference between the pump unit 3 and the electromagnetic valves 2*d* (the solenoid portion) which protrude from the valve mounting surface 201. With this, it is possible to improve the layout characteristic. That is, it is possible to ease the wiring connection to the electromagnetic valve 2*d* and the handling of the wiring (the wiring arrangement), and thereby to improve the workability. Moreover, it is possible to improve the workability when the both units 2 and 3 are integrally fixed. Besides, the pump unit 3 may be integrally fixed to confront the side surface (the surface opposite to the valve mounting surface) confronting the valve mounting surface of the first housing 20. In this case, it is possible to further surely avoid the above-described interference. The valve mounting surface 203 and the connector 320 of the pump cover 32 are provided on the surface 201 and the surface 301 which are adjacent to the control unit mounting surface 203. Accordingly, it is possible to decrease the length of the connection wiring of the control unit 2*e*, and the electromagnetic valves 2*d* and the motor 31, to ease the connection of the wiring, and the handling of the wiring (the wiring arrangement), and thereby to improve the workability.

The axial direction in which the master cylinder 2*b* is actuated and the axial direction of the rotation shaft of the pump are provided in the same x-axis direction (are in substantially parallel to each other). In this way, the axial direction of the master cylinder 2*b* (the master cylinder unit 2) is aligned with the axial direction of the pump (the pump unit 3). With this, it is possible to suppress the increase of the size of the brake unit 1. That is, the longitudinal direction of the master cylinder unit 2 is aligned with the longitudinal direction of the pump unit 3. With this, it is possible to suppress the entire size of the brake unit 1 in a vertical direction with respect to the plane including the axes of the both units (the axis of the master cylinder 2*b* and the rotation shaft of the pump), (within the size of one of the both units which has a larger vertical direction size). In particular, in the size of the both units 2 and 3 in the direction perpendicular to the axial direction, the size of the master cylinder unit 2 (including the reservoir tank 2*c* and the control unit 2*e*) is larger than the size of the pump unit 3 (including the motor 31). In this embodiment, the entire size of the brake unit 1 in the y-axis direction which is the direction perpendicular to the x-plane including the axis of the master cylinder 2*b* and the rotation shaft of the pump is suppressed within the y-axis direction size of the master cylinder unit 2. Moreover, when the longitudinal directions of the both units 2 and 3 are overlapped with each other (the both units 2 and 3 are overlapped with each other when viewed from the direction perpendicular to the x-axis), it is possible to suppress the size of the entire of the brake unit 1 in the longitudinal direction. In this embodiment, the both units 2 and 3 are substantially completely overlapped with each other. Accordingly, it is possible to suppress the size of the brake unit 1 in the above-described direction, within the longitudinal size of the master cylinder unit 2 (which has larger longitudinal size).

The pump unit 3 is integrally fixed so that the pump unit 3 is located on the lower surface side of the master cylinder unit 2 (in particular, the pump unit 3 confronts the surface 205 of the first housing 20 which is the lower surface) when the master cylinder unit 2 is mounted to the vehicle. Accordingly, it is possible to decrease the projection area of the brake unit 1 from the above. With this, it is possible to decrease the region in which the brake unit 1 is occupied within the engine room when viewed from the above, and to decrease the space within the engine room. Moreover, it is possible to improve the workability when the brake unit 1 is disposed in the engine room. Besides, it is sufficient that there is partially overlapped area when projected in the upward and downward directions. However, it is preferable that there is the half overlapped area or more. In this embodiment, the pump unit 3 is disposed directly below the master cylinder unit 2 so that the both units 2 and 3 are completely overlapped with each other. With this, the projection area in the upward and downward directions is minimum. With this, it is possible to improve the above-described effects.

When there is provided a discharge valve (check valve) which is disposed in the flow passage on the discharge side of the pump, and which is arranged to suppress the reverse flow of the brake fluid to the pump, it is preferable to provide this discharge valve on the master cylinder unit 2's side (within the first housing 20), not on the pump unit 3's side (within the second housing 30). With this, if the connection pipes 7 are detached, it is possible to suppress the leakage of the brake fluid from the master cylinder unit 2 (through the flow passage connected to the discharge side of the pump). Accordingly, it is possible to hold the normal brake function in which the wheel cylinder pressure is generated by the master cylinder pressure. That is, it is possible to improve the fail-safe characteristic.

Effects of First Embodiment

Hereinafter, the invention obtained from the first embodiment and the effects thereof are described.

(1) The brake unit 1 includes the master cylinder unit 2 including the master cylinder 2*b* which is fixed on the vehicle body, which is provided within the first housing 20, and which is interlocked with the brake pedal, and the pump unit 3 including the second housing 30 within which the pump arranged to be driven by the motor 31, and to increase the wheel cylinder pressure is disposed. The master cylinder unit 2 and the pump unit 3 are integrally fixed through the elastic member (the mount 6). Accordingly, it is possible to suppress the transmission of the vibration to the vehicle body's side at the operation of the pump.

(2) In the brake unit described in (1), the first housing 20 and the second housing 30 are connected through the bracket 5, so that the both units 2 and 3 are integrally fixed.

By using the bracket 5 in this way, it is possible to improve the freedom of the integral layout.

(3) In the brake unit 1 described in (2), the elastic member (the mounts 6*a* and 6*b*) are provided between the second housing 30 and the bracket 5*a*.

In this way, the elastic member is provided at a position near the vibration source before the bracket 5. It is possible to obtain the high vibration suppression effect.

(4) In the brake unit 1 described in (1), the rotation shaft of the motor 31 is in a direction (the x-axis direction) toward the mounting surface (the floor panel 8) on which the master cylinder unit 2 is mounted to the vehicle.

In this way, the disposition of the rotation shaft of the motor 31 is the direction in which it bangs the mounting surface by the rotation of the motor 31. Accordingly, it is possible to suppress the vibration and the noise.

(5) In the brake unit described in (4), the axial direction in which the master cylinder 2b is actuated and the axial direction of the rotation shaft of the pump are the same direction (the x-axis direction).

By aligning the axial directions in this way, it is possible to suppress the increase of the size of the brake unit 1.

(6) In the brake unit 1 described in (1), the motor 31 is mounted to the second housing 30. The second housing 30 and the motor 31 are connected through the brackets 5a and 5b to the first housing 20.

Accordingly, it is possible to fix the pump unit 3 to the first housing 20 at the two points of the second housing 30 and the motor 31, and thereby to rigidly fix.

(7) In the brake unit 1 described in (6), the brackets 5a and 5b are provided to surround the pump unit 3. The second housing 30 is fixed to the first surface (the surface of the bracket 5a which extends in the x-axis direction). The motor 31 is fixed to the second surface perpendicular to the first surface (the portion of the bracket 5b which extends in substantially parallel with the y-z plane).

By supporting the pump unit 3 in the two different directions in this way, it is possible to rigidly fix.

(8) In the brake unit 1 described in (1), the first housing 20 of the master cylinder unit 2 includes the valve mounting surface 201 on which the electromagnetic valves 2d arranged to switch the flow passages of the brake fluid is mounted. The pump unit 3 is integrally fixed to confront the surface 205 other than the valve mounting surface 201 of the first housing 20.

Accordingly, it is possible to improve the layout characteristic.

(9) In the brake unit 1 described in (8), the first housing 20 includes the side surface confronting the valve mounting surface. The pump unit 3 is integrally fixed to confront the side surface.

Accordingly, it is possible to improve the layout characteristic.

(10) In the brake unit 1 described in (8), the pump unit 3 is integrally fixed to confront the surface 205 of the first housing 20 which is the lower surface of the master cylinder unit 2 when the master cylinder unit 2 is mounted to the vehicle.

Accordingly, it is possible to decrease the projection area of the brake unit 1 from the above.

(11) In the brake unit 1 described in (1), the pump is the gear pump.

Accordingly, it is possible to improve the silence characteristic.

(12) The brake unit 1 includes the master cylinder unit 2 including the master cylinder 2b disposed within the first housing 20, the pump unit 3 including the second housing 30 within which the pump arranged to increase the wheel cylinder pressure is disposed, and the vibration proofing member (the mount 6) arranged to suppress the transmission of the vibration from the pump unit 3 to the master cylinder unit 2. The pump unit 3 and the master cylinder unit 2 are elastically integrated with each other by the vibration proofing member.

Accordingly, it is possible to suppress the transmission of the vibration to the vehicle body's side at the operation of the pump.

(13) In the brake unit described in (12), the first housing 20 and the second housing 30 are integrated by the bracket 5.

By using the bracket 5 in this way, it is possible to improve the freedom of the layout of the integration.

(14) In the brake unit 1 described in (13), the vibration proofing member (the mount 6) is disposed between the second housing 30 and the bracket 5.

In this way, the elastic member is provided at a position near the vibration source before the bracket 5.

(15) In the brake unit 1 described in (12), the axial direction in which the master cylinder 2b is actuated and the axial direction of the rotation shaft of the pump are the same direction (the x-axis direction).

In this way, the axial directions are aligned. With this, it is possible to suppress the increase of the size of the brake unit 1.

(16) In the brake unit 1 described in (12), the pump unit 3 is integrally fixed to confront the surface 205 of the first housing 20 which is the lower surface of the master cylinder unit 2 when the master cylinder unit 2 is mounted to the vehicle.

Accordingly, it is possible to decrease the projection area of the brake unit 1 from the above.

(17) In the brake unit 1 described in (12), the first housing 20 of the master cylinder unit 2 includes the valve mounting surface 201 on which the electromagnetic valve 2d arranged to switch the flow passages of the brake fluid is mounted. The pump unit 3 is integrally fixed to confront the surface other than the valve mounting surface 201 of the first housing 20.

Accordingly, it is possible to improve the layout characteristic.

(18) The brake unit 1 includes the master cylinder unit 2 including the master cylinder 2b provided within the first housing 20, the electromagnetic valve 2d which is mounted on the predetermined surface 201, and which is arranged to switch the flow passages of the brake fluid, the pump unit 3 including the second housing 30 within which the pump arranged to increase the wheel cylinder pressure is disposed, and the vibration proofing member (the mount 6) arranged to suppress the transmission of the vibration from the pump unit 3 to the master cylinder unit 2. The pump unit 3 is integrally fixed to confront the other surface 205 except for the predetermined surface 201 of the first housing 20 through the vibration proofing member.

Accordingly, it is possible to suppress the transmission of the vibration to the vehicle body's side at the operation of the pump.

(19) In the brake unit 1 described in (18), the pump unit 3 is integrally fixed to be positioned on the lower surface side of the master cylinder unit 2 when the master cylinder unit 2 is mounted to the vehicle.

Accordingly, it is possible to decrease the projection area of the brake unit 1 from the above.

Second Embodiment

In a brake unit 1 according to a second embodiment, the pump unit 3 is disposed on a lateral side of the master cylinder unit 2. First, a structure is illustrated. Hereinafter, the illustrations of the same structure as the first embodiment is omitted by adding the same symbols. The only different portions are illustrated. FIG. 14 to FIG. 19 show the entire of the brake unit 1 according to the second embodiment, in the same directions as FIG. 1 to FIG. 6. The surface 201 of the first housing 20 on the x-axis negative direction side includes two pipe mounting portions 206 on which one ends of the connection pipes 7 are mounted, and which are located on the z-axis positive direction side and the z-axis negative direction side in the protrusion portion of the surface 201 toward the y-axis positive direction side, in addition to the electromagnetic valves 2d. That is, the surface 202 constitutes the valve mounting surface and the pipe mounting surface. The surface 202 of the first housing 20 on the y-axis positive direction side includes two bracket mounting portions 207 to which the brackets 5 are mounted, which are provided at a portion on the z-axis positive direction side and on the x-axis positive direction side, and provided at a portion which is a substantially intermediate position in the z-axis direction on the x-axis negative direction side. That is, the surface 202 constitutes the bracket mounting surface. The surface 210 of the recessed portion 21 of the first housing 20 does not include the bracket mounting portion 207. The surface 305 of the second housing 30 on the z-axis negative direction side includes two bracket mounting portions 307 on which the brackets 5 are mounted, and which are positioned on the y-axis positive direction side and the y-axis negative direction side to sandwich the axis of the second housing 30. That is, the surface 305 constitutes the bracket mounting surface. The surface 303 of the second housing 30 on the y-axis negative direction side does not include the bracket mounting portion 307.

The first housing 20 and the second housing 30 are integrated by the bracket 5. The second housing 30 is connected through the bracket 5 to the first housing 20. Moreover, the motor 31 is connected through the bracket 5 to the first housing 20. That is, the pump unit 3 is fixed to the first housing 20 at two points of the second housing 30 and the motor 31. The bracket 5 has a shape in which one plate is bent at a right angle. The bracket 5 includes a portion 51 extending in substantially parallel with the x-z plane; a portion 52 which extends from a z-axis negative direction end of this portion 51 toward the y-axis positive direction side, and which extends in substantially parallel with the x-y plane; and a portion 53 which extends from an x-axis positive direction end of this portion 52 toward the z-axis positive direction side, which extends in substantially parallel with the y-z plane, and which has a y-axis negative direction end that is fixed to the x-axis positive direction end of the portion 51. The structure of the mount 6a is identical to the structure of the mount 6b.

Figure 15:
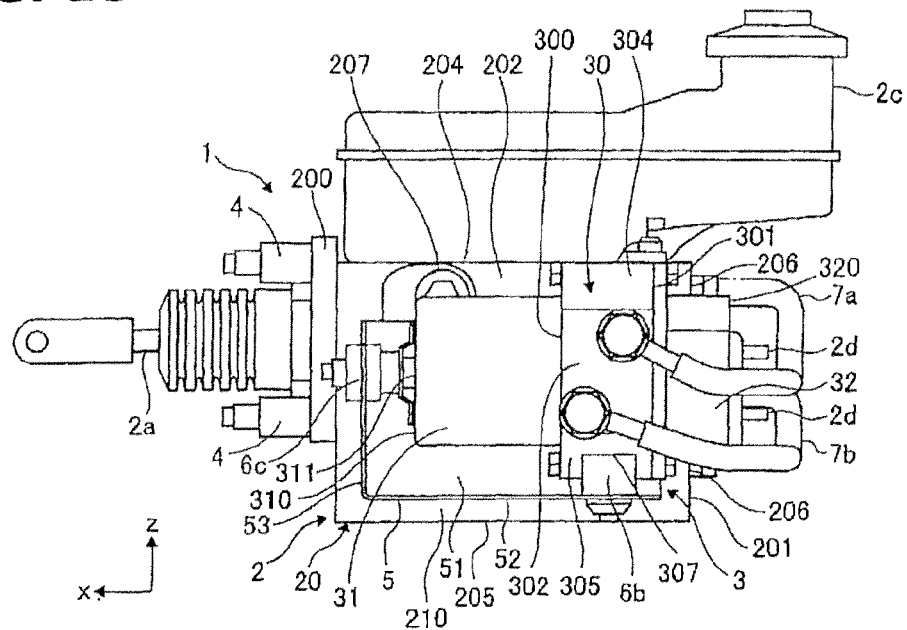
FIG. 15 is a side view of the brake unit according to the second embodiment.
Figure 16:
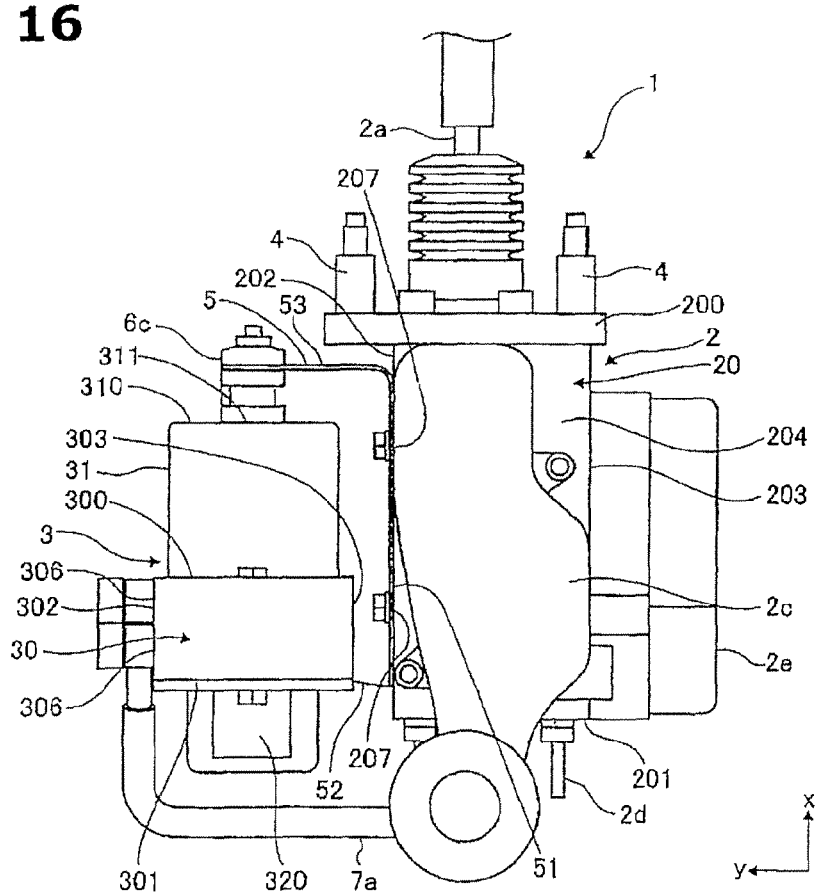
FIG. 16 is a top view of the brake unit according to the second embodiment.

The bracket 5 is provided to surround the pump unit 3 (including the motor 31). In particular, the portion 51 is mounted to the bracket mounting portion 207 of the first housing 20 without through the mount so as to confront the surface 303 of the second housing 30 on the y-axis negative direction side. The portion 52 is mounted to the bracket mounting portion 307 through the mounts 6a and 6b so as to confront the bracket mounting surface 305 of the second housing 30. Furthermore, the portion 53 is mounted to the bracket mounting portion 311 through the mount 6c so as to confront the surface 310 of the motor 31 on the x-axis positive direction side. As shown in FIG. 15, the portions 52 and 53 surround the x-axis negative direction side and the z-axis negative direction side of the pump unit 3 (including the motor 31) when viewed from the y-axis direction. In this way, the second housing 30 is fixed on the first surface (portion 52) of the bracket 5 which extends in substantially parallel with the x-y plane. On the other hand, the motor 31 is fixed to the portion 53 (the second surface) of the bracket 5 which extends in substantially parallel with the y-z plane to be perpendicular to the first surface. That is, the bracket 5 supports the pump unit 3 in the two different directions (in the x-axis direction and in the direction perpendicular to the x-axis direction).

Figure 19:
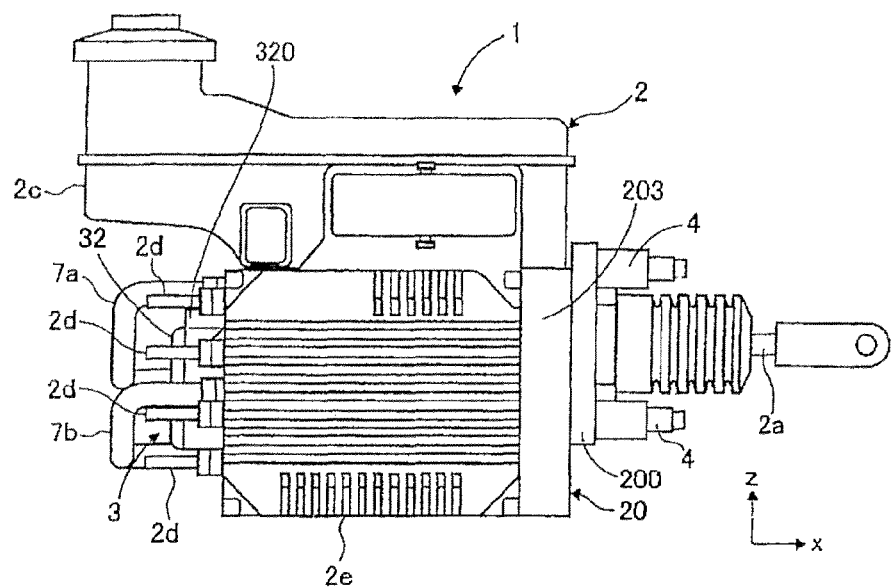
FIG. 19 is a side view of the brake unit according to the second embodiment.
Figure 20:
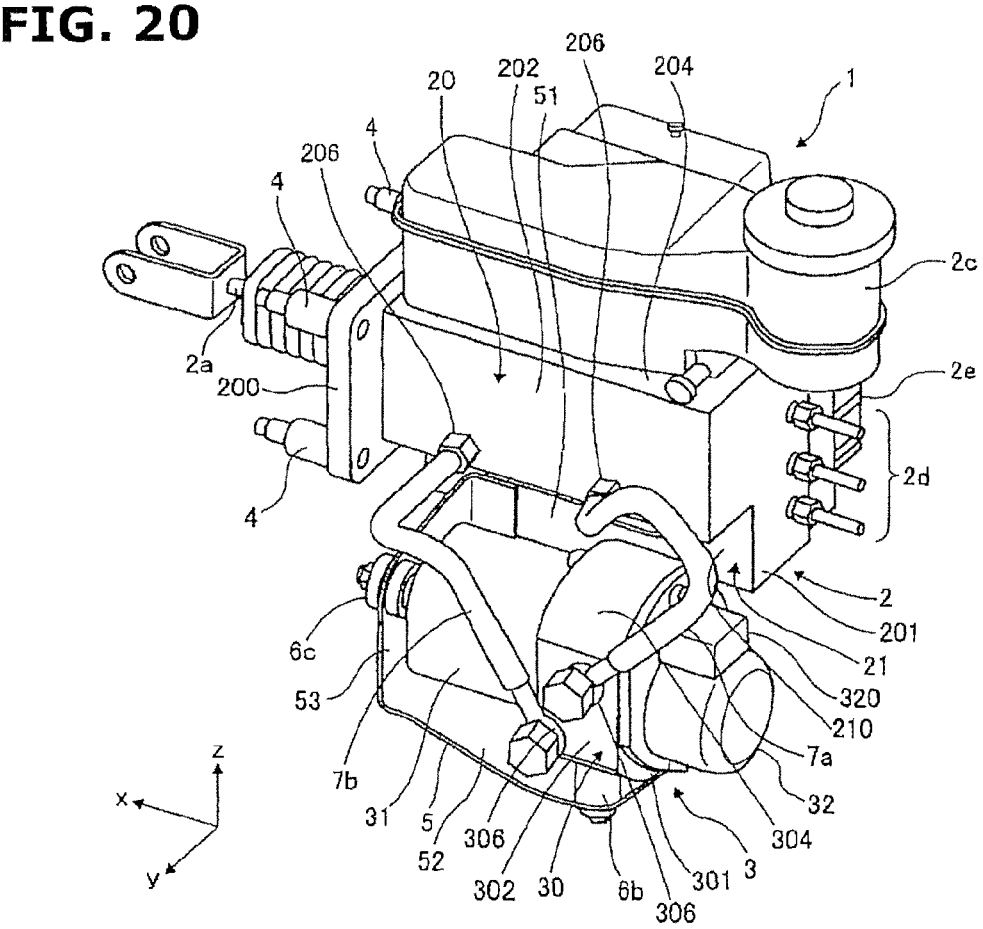
FIG. 20 is a perspective view of a brake unit according to a third embodiment.
Figure 21:
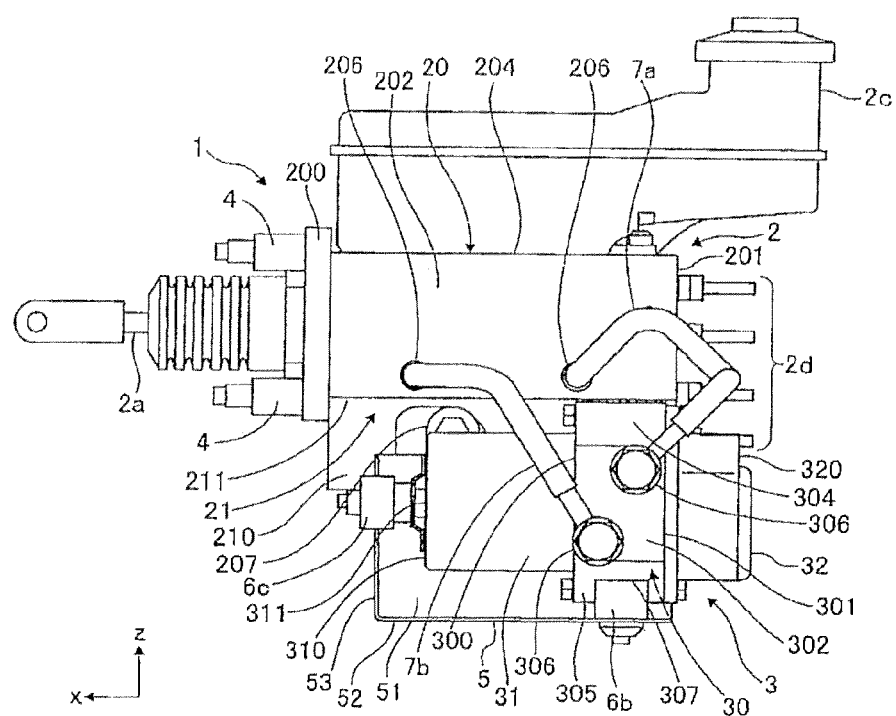
FIG. 21 is a side view of the brake unit according to the third embodiment.
Figure 22:
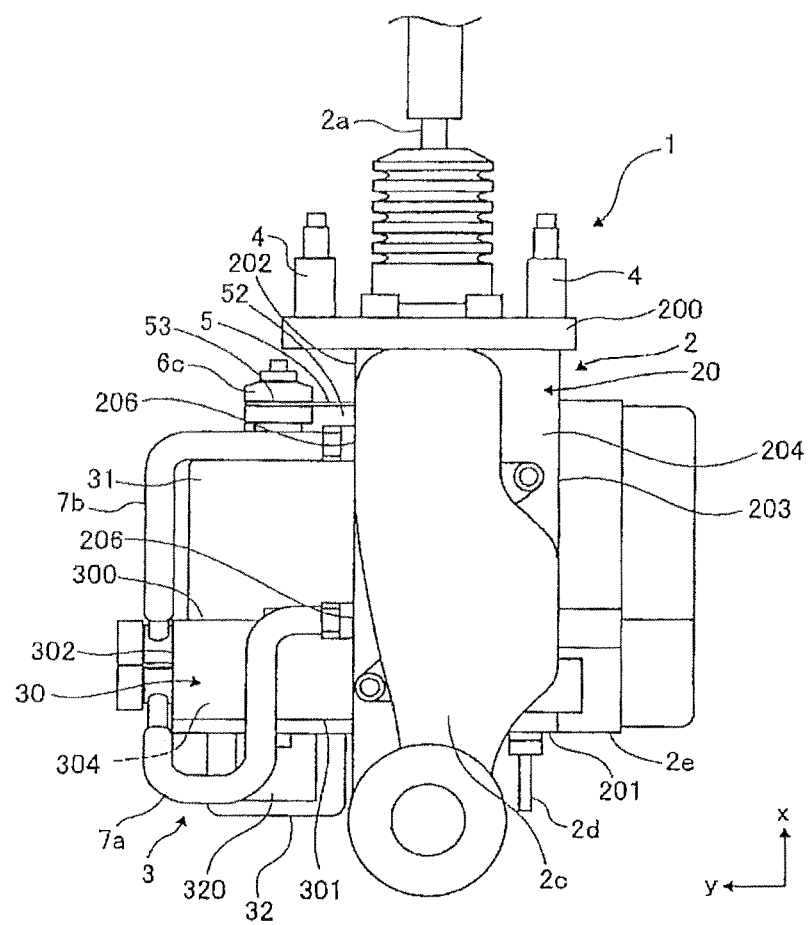
FIG. 22 is a top view of the brake unit according to the third embodiment.

In this embodiment, the pump unit 3 is disposed on the lateral side of the master cylinder unit 2. When viewed in the y-axis direction, the pump unit 3 is integrally fixed on the master cylinder unit 2 so as to confront the surface 202 of the first housing 20 which is the lateral direction side surface (the y-axis positive direction side) of is the master cylinder unit 2 when the master cylinder unit 2 is mounted to the vehicle (that is, so as to be positioned on the lateral direction side surface side of the master cylinder unit 2). When viewed in the z-axis direction, these are disposed so that the z-axis direction distance between the surface 204 of the first housing 20 on the z-axis positive direction side and (the apex of) the surface 304 of the second housing 30 on the z-axis positive direction side becomes small as much as possible (to become substantially zero in this embodiment). (The apex of) The surface 305 of the second housing 30 on the z-axis negative direction side is disposed on the z-axis positive direction side of the surface 205 of the first housing 20 on the z-axis negative direction side. When viewed in the x-axis direction, the surface 310 of the motor 31 (the case) on the x-axis positive direction side is disposed on the x-axis negative direction side of the surface (the flange portion 200) of the first housing 20 on the x-axis positive direction side. The x-axis negative direction side surface 301 of the second housing 30 is disposed on the x-axis positive direction side of the surface 201 of the first housing 20 on the x-axis negative direction side. By these dispositions in the respective directions, when the brake unit 1 is viewed from the y-axis direction side as shown in FIG. 15 and FIG. 19, the second housing 30 of the pump unit 3 (including the motor 31) is received within the outline (profile) of the first housing 20 of the master cylinder unit 2. Moreover, the x-axis negative direction end of the pump cover 32 protruding from the surface 301 of the second housing 30 is disposed on the x-axis positive direction side of the x-axis negative direction end of the electromagnetic valve 2d (the solenoid portion) protruding from the surface 201 of the first housing 20. The connection pipes 7 disposed to circle the x-axis negative direction side end of this pump cover 32 can be disposed on the x-axis positive direction side of the x-axis negative direction end of the reservoir tank 2c. Moreover, these are disposed so that a z-axis direction distance between the head portion 611 of the bolt 61b for mounting the bracket on the bracket mounting surface 305 of the second housing 30 on the z-axis negative direction side, and the surface 205 of the first housing 20 on the z-axis negative direction side becomes small as much as possible (to become substantially zero in this embodiment). Accordingly, when the brake unit 1 is viewed from the y-axis direction side, the most of the head portion 611 of the bolt 61b is covered by the first housing 20.

Figure 17:
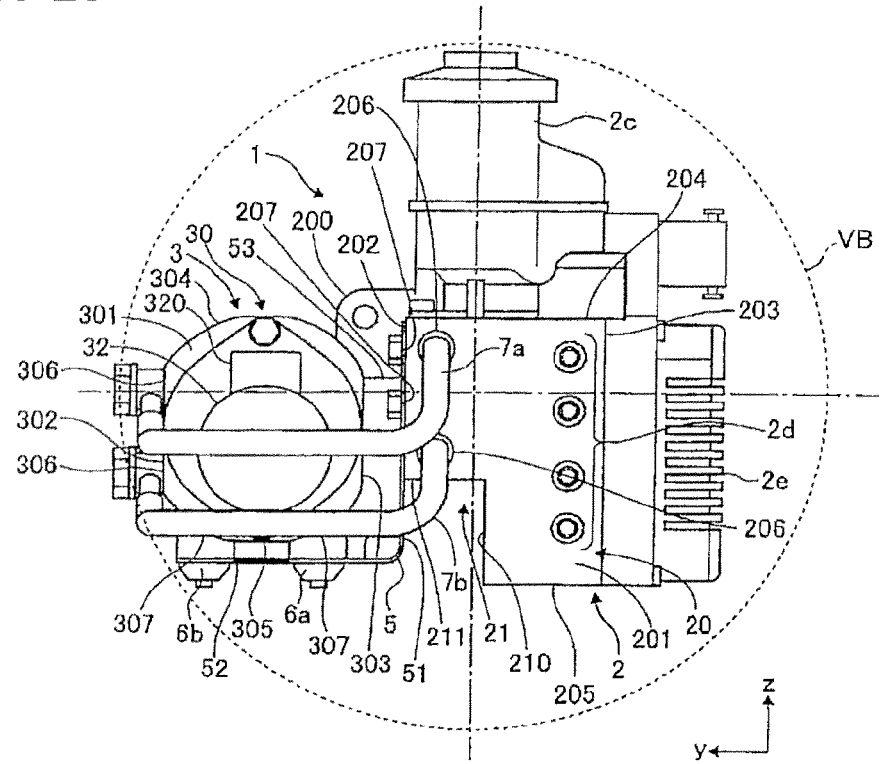
FIG. 17 is a front view of the brake unit according to the second embodiment.
Figure 18:
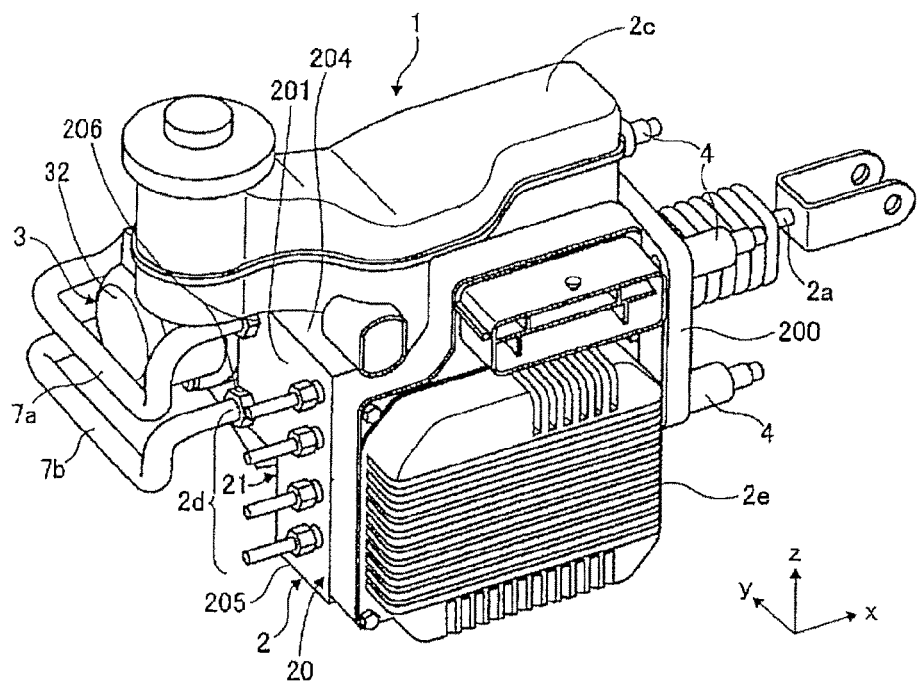
FIG. 18 is a perspective view of the brake unit according to the second embodiment.

Next, the functions are illustrated. As shown in FIG. 17, the brake unit 1 can be disposed to be substantially received within the installation space VB of the mastervac. Accordingly, it is unnecessary to provide another space for disposing the brake unit 1. The bracket connecting the second housing 30 to the first housing 20, and the bracket connecting the motor 31 to the first housing 20 are integrated as the bracket 5. Accordingly, it is possible to rigidly fix the units 2 and 3. The pump unit 3 is integrally fixed so as to be positioned on the lateral direction side surface side of the master cylinder unit 2 (in particular, to confront the surface 202 of the first housing 20 which is the lateral direction side surface) when the master cylinder unit 2 is mounted to the vehicle. Consequently, it is possible to decrease the projection area of the brake unit 1 in the lateral direction. Therefore, it is possible to decrease the region in which the brake unit 1 is occupied within the engine room when viewed from the lateral direction, and to decrease the space of the engine room. That is, it is possible to decrease the size of the brake unit 1 in the upward and downward directions. Accordingly, it is possible to readily apply, for example, to a compact vehicle. Besides, it is sufficient that there is the partially overlapped region when projected in the lateral direction. However, it is preferable that there is the half overlapped portion or more. In this embodiment, the pump unit 3 is disposed right beside the master cylinder unit 2 so that the both units 2 and 3 are completely overlapped with each other in the lateral direction, so that the projection area in the lateral direction becomes minimum. With this, it is possible to improve the above-described effects. In addition, it is possible to obtain the same effect and the operation identical to those of the first embodiment, by the structure identical to that of the first embodiment.

Third Embodiment

In the brake unit 1 according to the third embodiment, the pump unit 3 is disposed on the recessed portion 21 of to the master cylinder unit 2. First, the structure is illustrated. Hereinafter, the explanations of the structure identical to those of the first embodiment are omitted by adding the identical symbols. The only different portions are illustrated. FIG. 20 to FIG. 25 show the entire of the brake unit according to the third embodiment in the directions identical to those of FIG. 1 to FIG. 6.

The surface 305 of the second housing 30 on the z-axis negative direction side includes two bracket mounting portions 307 which are identical to those of the second embodiment. The first housing 20, the second housing 30, and the motor 31 are integrated by the mounting structure (the bracket 5 and the mount 6) which is identical to that of the second embodiment. The portion 51 of the bracket 5 is mounted to the bracket mounting portion 207 of the recessed portion 21 of the first housing 20 without through the mount, so as to confront the surface 303 of the second housing 30 on the y-axis negative direction side. In this embodiment, the pump unit 3 including the motor 31 is disposed in the recessed portion 21 of the master cylinder unit 2. The pump unit 3 is integrally fixed to the master cylinder unit 2 so as to confront the surface 210 of the recessed portion 21 (which extends in substantially parallel with the x-z plane) when the master cylinder unit 2 is mounted to the vehicle. That is, the motor 31 and the pump unit 3 (the substantially halves of the motor 31 and the pump unit 3 on the z-axis positive direction side) are overlapped with the recessed portion 21 in the z-axis direction. Moreover, the pump unit 3 is integrally fixed on the master cylinder unit 2 so as to confront the surface 211 of the recessed portion 21 (which extends in substantially parallel with the x-y plane). That is, the motor 31 and the pump unit 3 (the parts of the motor 31 and the pump unit 3 on the y-axis negative direction side) are overlapped with the recessed portion 21 in the y-axis direction.

Figure 23:
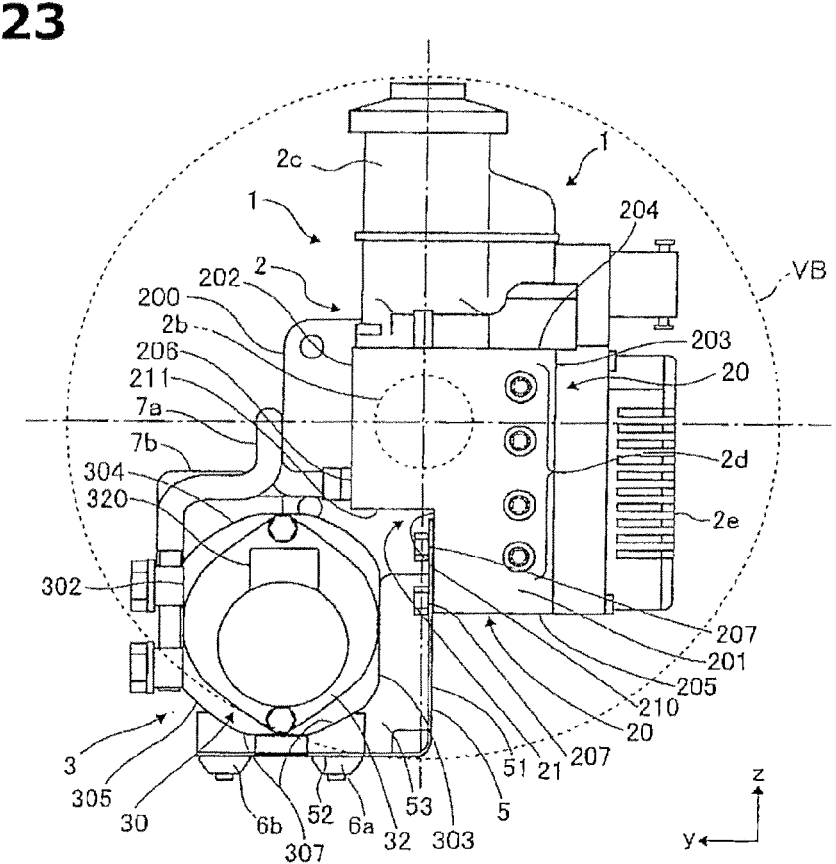
FIG. 23 is a front view of the brake unit according to the third embodiment.
Figure 24:
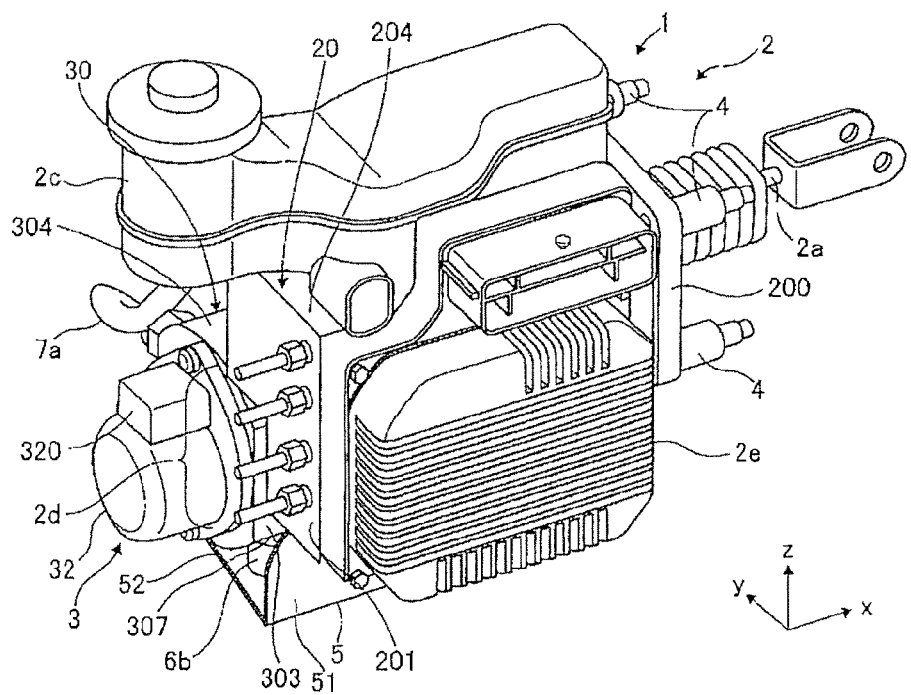
FIG. 24 is a perspective view of the brake unit according to the third embodiment.
Figure 25:
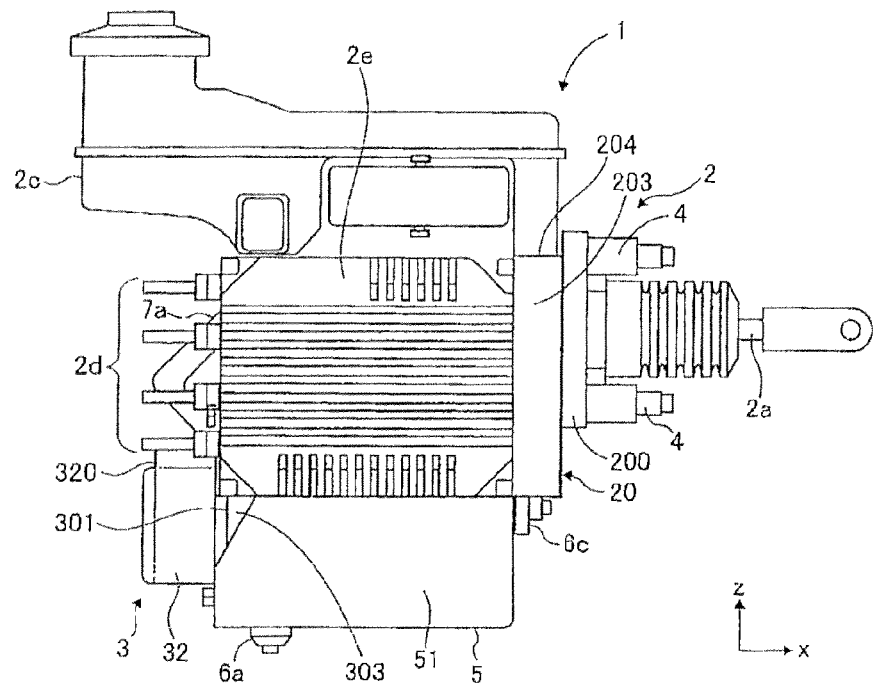
FIG. 25 is a side view of the brake unit according to the third embodiment.
Figure 26:
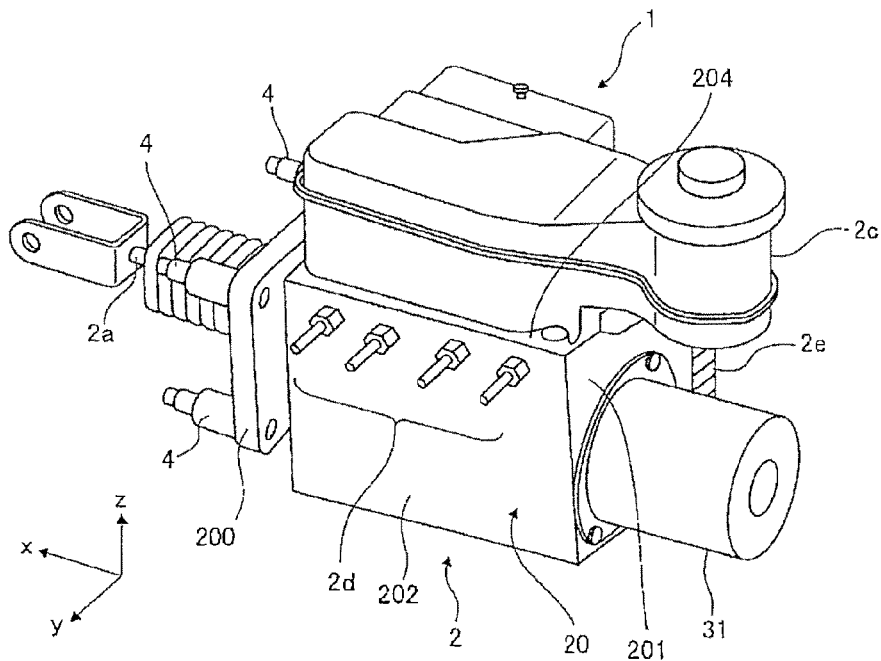
FIG. 26 is a perspective view of a brake unit according to a fourth embodiment.
Figure 27:
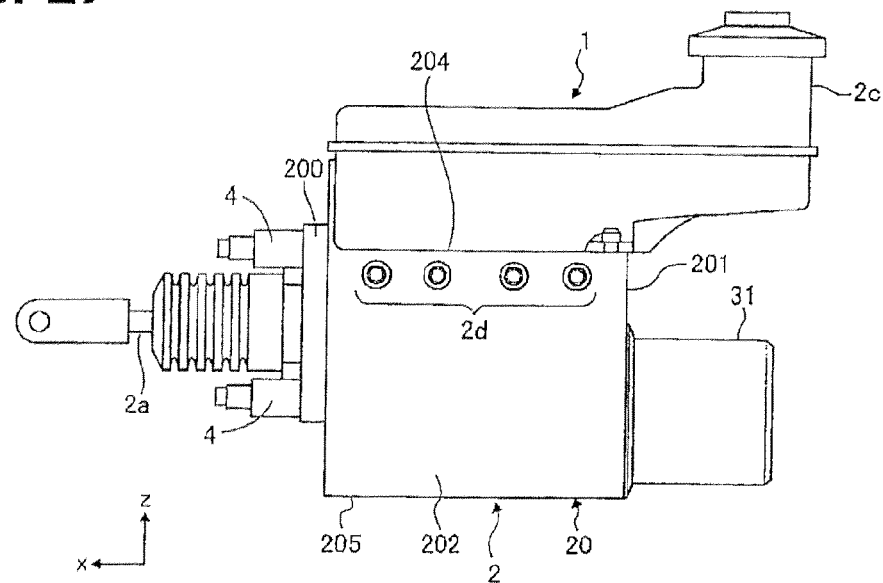
FIG. 27 is a side view of the brake unit according to the fourth embodiment.
Figure 28:
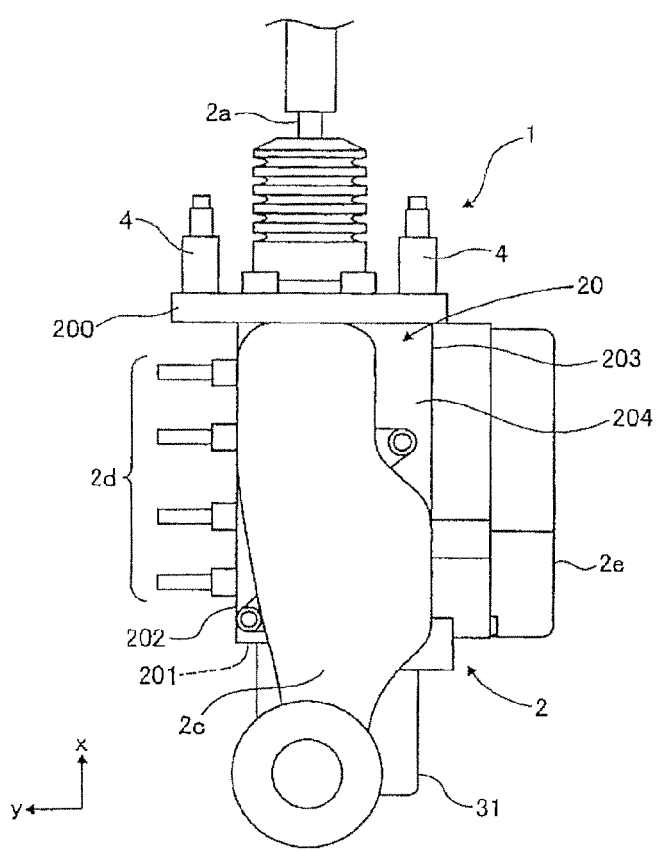
FIG. 28 is a top view of the brake unit according to the fourth embodiment.
Figure 29:
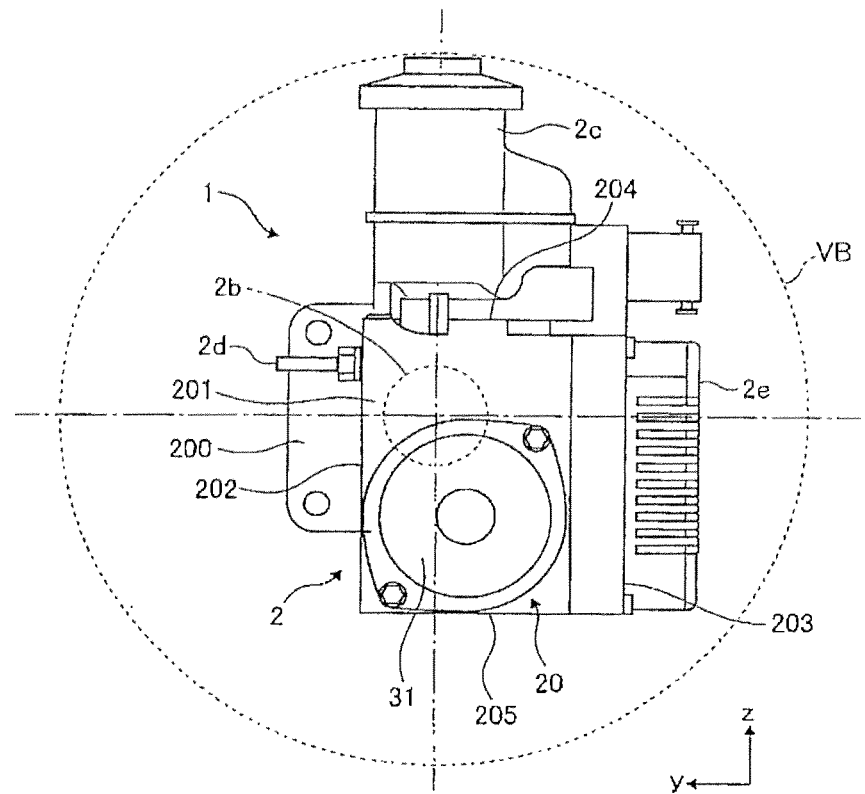
FIG. 29 is a front view of the brake unit according to the fourth embodiment.
Figure 30:
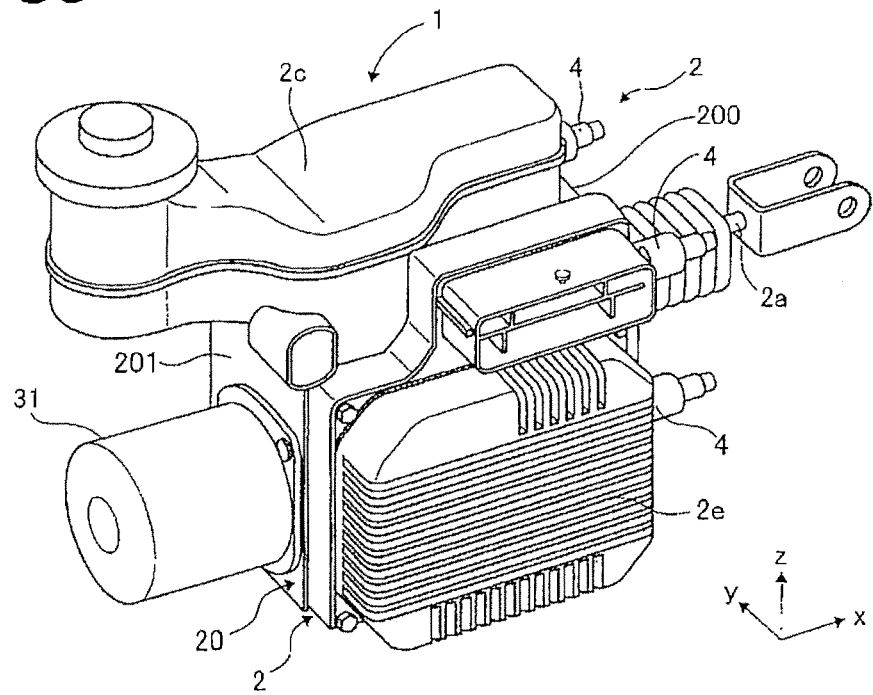
FIG. 30 is a perspective view of the brake unit according to the fourth embodiment.
Figure 31:
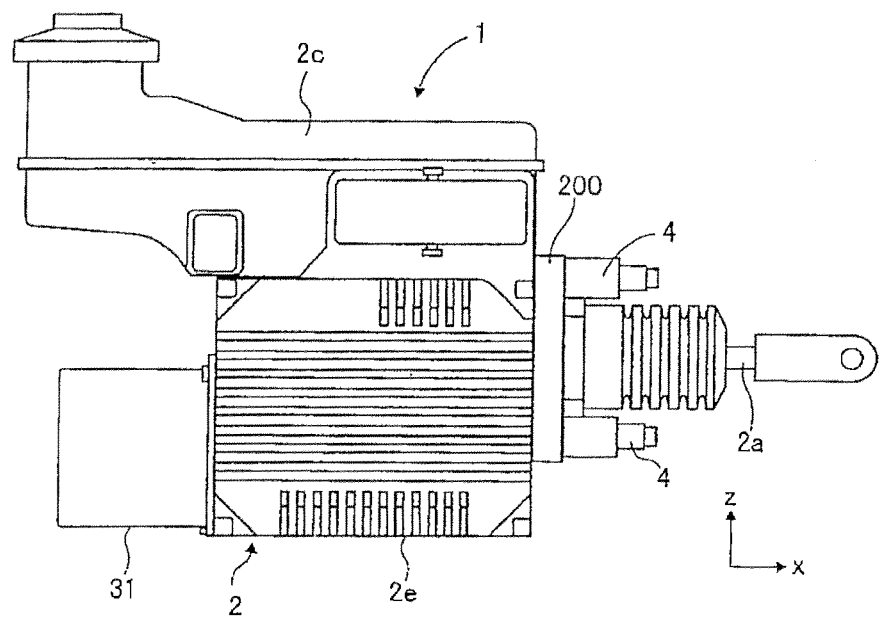
FIG. 31 is a side view of the brake unit according to the fourth embodiment.

Next, the functions are illustrated. The pump unit 3 is disposed to enter the recessed portion 21 of the master cylinder unit 2. With this, it is possible to decrease the distance between the axis of the pump unit 3 (the pump) and the axis of the master cylinder unit 2 (the master cylinder 2b) as much as possible. Accordingly, as shown in FIG. 23, it is possible to readily receive the brake unit 1 within the installation space VB of the conventional mastervac. That is, in this embodiment, the master cylinder 2b and the electromagnetic valves 2d are disposed in the first housing 20 of the master cylinder unit 2 (for example, so that the axial direction of the master cylinder 2b and the electromagnetic valves 2d are in substantially parallel with each other). With this, it is possible to decrease the size of the first housing 20 as much as possible. By disposing the pump unit 3 by using the recessed portion 21 formed accordingly, it is possible to suppress the size of the entire of the brake unit 1 in the axial perpendicular direction (the direction perpendicular to the axial direction). That is, it is possible to suppress the size of the brake unit 1 in the both directions at some degree, by overlapping the both units in the upward and downward directions and in the lateral direction at some degree. Therefore, it is possible to improve the mountability of the brake unit 1 to the vehicle as described above. In addition, it is possible to obtain the operations and effects which are identical to those of the first embodiment, by the structure identical to that of the first embodiment.

Fourth Embodiment

In a brake unit 1 according to a fourth embodiment, the housings of the pump unit 3 and the master cylinder unit 2 are integrated. First, the structure is illustrated. Hereinafter, the explanations of the structures which are identical to those of the first embodiment are omitted by adding the same symbols. The only different portions are illustrated. FIG. 26 to FIG. 31 show the entire of the brake unit 1 according to the third embodiment, in the directions identical to those of FIG. 1 to FIG. 6. The master cylinder unit 2 and the pump unit 3 are integrated with each other. The master cylinder 2b and the pump are received (installed) within the same housing 20. Accordingly, there are not provided the mounting structure (the bracket 5 and the mount 6) of the units 2 and 3 and the motor 31, and the connection pipes 7, unlike the first embodiment. The housing 20 has the substantially rectangular parallelepiped shape. The housing 20 does not include the recessed portion 21 of the first housing 20 in the first embodiment. The plurality of the electromagnetic valves 2d are arranged in a row in the x-axis direction on the z-axis positive direction side of the surface 202 of the housing 20 on the y-axis positive direction side. That is, the surface 202 constitutes the valve mounting surface. The motor 31 is fixed on the z-axis negative direction side of the surface 201 of the housing 20 on the x-axis negative direction side. That is, the surface 201 constitutes the motor mounting surface. A direction in which the rotation shaft of the motor 31 extends is the x-axis direction. The direction in which the rotation shaft of the motor 31 extends is the direction toward the unit mounting surface (the floor panel 8) on which the master cylinder unit 2 is mounted to the vehicle. Moreover, the axial (line) direction of the rotation shaft of the pump extends along the direction of the studs 4 (the x-axis direction). The x-axis negative direction end of the motor 31 is disposed on the x-axis positive direction side of the x-axis negative direction end of the reservoir tank 2c. Accordingly, when the brake unit 1 is viewed from the z-axis positive direction side, the most of the motor 31 is covered by the reservoir tank 2c.

Next, the functions are illustrated. The housing of the master cylinder unit 2 and the housing of the pump unit 3 are integrated. With this, it is possible to further decrease the entire size of the brake unit 1, and to improve the mountability to the vehicle. The bracket 5 and the connection pipes 7 are not needed. It is possible to simplify the structure, to improve the mounting workability, and to improve the fail-safe characteristic. The motor 31 is disposed on the axial direction end surface of the housing 20. Accordingly, it is possible to suppress the axial perpendicular direction size (the size of the direction perpendicular to the axial direction) (the lateral direction size and the upward and downward direction size) of the brake unit 1, and to improve the mountability to the vehicle. When viewed from the above, the motor 31 is disposed to be masked by the portion of the reservoir tank 2c which protrudes in the axial direction (in the x-axis negative direction) of the brake unit 1 from the upper surface 204 of the housing 20. Accordingly, it is possible to suppress the increase of the size of the brake unit in the axial direction (in the x-axis direction). The rotation shaft of the motor 31 is provided in the direction of the stud shafts 4 (in the x-axis direction), that is, the direction toward the unit mounting surface (the floor panel 8). Similarly to the first embodiment, it is possible to suppress the transmission of the vibration of the motor 31 to the vehicle body's side. Moreover, it is possible to obtain the same functions and the same operations as the first embodiment, by the structure identical to those of the first embodiment.

[Effects]

(20) The brake unit 1 includes the housing 20 which is fixed to the floor panel 8 of the vehicle body by the stud shafts 4, and which includes the master cylinder 2b that is arranged to be interlocked with the brake pedal, and the pump that has a rotation shaft rotationally driven by the motor 31, and that is arranged to increase the wheel cylinder pressure. The axial line direction of the rotation shaft extends along the direction of the stud shaft 4 (the x-axis direction).

Accordingly, it is possible to suppress the transmission of the vibration to the floor panel 8 in the brake unit 1 in which the housings are integrated.

Other Embodiments

Hereinabove, the examples attaining the present invention are illustrated based on the embodiments. The concrete structure of the present invention is not limited to the embodiments. The present invention includes the variations of the designs and so on as long as it is not deviated from the gist of the invention. For example, the brake unit 1 of the embodiments are preferable for the vehicle which has no mastervac, or for the vehicle which is arranged to generate the regenerative braking force. However, the brake unit 1 according to the embodiments are applicable to the vehicle other than these. The shape of the bracket 5 and the positions of the bracket mounting portions 207, 307, and 311 of the units 2 and 3 are one example. It is possible to employ the other shapes and the other positions. Moreover, the shape of the connection pipe 7 and the positions of the pipe mounting portions 206 and 306 are one example. It is possible to employ other shapes and other positions.

EXPLANATION OF SYMBOLS

1 brake unit
2 master cylinder unit
2b master cylinder
20 first housing
3 pump unit
30 second housing
31 motor
4 stud shafts
5 bracket
6 mount (elastic member)
8 floor panel (mounting surface)

The invention claimed is:

1. A brake unit comprising:
a master cylinder unit which is fixed to a vehicle body, and which includes a master cylinder that is received within a first housing, and that is arranged to be interlocked with a brake pedal; and
a pump unit which is arranged to be driven by a motor, and which includes a second housing within which a pump arranged to increase a wheel cylinder pressure is received,
the master cylinder unit and the pump unit being integrally fixed through an elastic member,
wherein the first housing and the second housing are connected through a bracket so that the both units are integrally fixed, and
wherein the elastic member is provided between the second housing and the bracket.

2. The brake unit as claimed in claim 1, wherein the motor is mounted to the second housing; and the second housing and the motor are connected through the bracket to the first housing.

3. The brake unit as claimed in claim 2, wherein the bracket is provided to surround the pump unit; the second housing is fixed on a first surface of the bracket; and the motor is fixed on a second surface perpendicular to the first surface.

4. The brake unit as claimed in claim 1, wherein the first housing includes a valve mounting surface on which an electromagnetic valve arranged to switch flow passages of a brake fluid is mounted; and the pump unit is integrally fixed to confront a surface of the first housing which is other than the valve mounting surface.

5. The brake unit as claimed in claim 4, wherein the first housing includes a side surface confronting the valve mounting surface; and the pump unit is integrally fixed to confront the side surface.

6. The brake unit as claimed in claim 1, wherein the pump is a gear pump.

7. A brake unit comprising:
a master cylinder unit which is fixed to a vehicle body, and which includes a master cylinder that is received within a first housing, and that is arranged to be interlocked with a brake pedal; and
a pump unit which is arranged to be driven by a motor, and which includes a second housing within which a pump arranged to increase a wheel cylinder pressure is received,
the master cylinder unit and the pump unit being integrally fixed through an elastic member,
wherein a rotation shaft of the motor is provided in a direction toward a mounting surface on which the master cylinder unit is mounted to the vehicle body, and
wherein an axial direction in which the master cylinder is actuated and an axial direction of the rotation shaft of the pump are the same direction.

8. A brake unit comprising:
a master cylinder unit which is fixed to a vehicle body, and which includes a master cylinder that is received within a first housing, and that is arranged to be interlocked with a brake pedal; and
a pump unit which is arranged to be driven by a motor, and which includes a second housing within which a pump arranged to increase a wheel cylinder pressure is received,
the master cylinder unit and the pump unit being integrally fixed through an elastic member, wherein the first housing includes a valve mounting surface on which an electromagnetic valve arranged to switch flow passages of a brake fluid is mounted; and the pump unit is integrally fixed to confront a surface of the first housing which is other than the valve mounting surface, wherein the pump unit is integrally fixed to confront the surface of the first housing which is a lower surface of the master cylinder unit when the master cylinder unit is mounted to the vehicle body.

9. A brake unit comprising:

a master cylinder unit including a master cylinder provided within a first housing;

a pump unit including a second housing within which a pump arranged to increase a wheel cylinder pressure is received; and a vibration proofing member arranged to suppress a transmission of vibration from the pump unit to the master cylinder unit, the pump unit and the master cylinder unit being elastically integrated with each other by the vibration proofing member, wherein the first housing and the second housing are integrated by a bracket, and wherein the vibration proofing member is disposed between the second housing and the bracket.

10. The brake unit as claimed in claim 9, wherein the first housing includes a valve mounting surface on which an electromagnetic valve arranged to switch a flow passage of a brake fluid is mounted; and the pump unit is integrally fixed to confront a surface of the first housing which is other than the valve mounting surface.

11. A brake unit comprising:

a master cylinder unit including a master cylinder provided within a first housing;

a pump unit including a second housing within which a pump arranged to increase a wheel cylinder pressure is received; and a vibration proofing member arranged to suppress a transmission of vibration from the pump unit to the master cylinder unit, the pump unit and the master cylinder unit being elastically integrated with each other by the vibration proofing member, wherein an axial direction in which the master cylinder is actuated and an axial direction of a rotation shaft of the pump are the same direction.

12. A brake unit comprising:

a master cylinder unit including a master cylinder provided within a first housing;

a pump unit including a second housing within which a pump arranged to increase a wheel cylinder pressure is received; and a vibration proofing member arranged to suppress a transmission of vibration from the pump unit to the master cylinder unit, the pump unit and the master cylinder unit being elastically integrated with each other by the vibration proofing member, wherein the pump unit is integrally fixed so as to confront a surface of the first housing which is a lower surface of the master cylinder unit when the master cylinder unit is mounted to a vehicle.

13. A brake unit comprising:

a master cylinder unit including a master cylinder provided within a first housing;

an electromagnetic valve which is mounted to a predetermined surface of the first housing, and which is arranged to switch a flow passage of a brake fluid;

a pump unit including a second housing within which a pump arranged to increase a wheel cylinder pressure is received; and a vibration proofing member arranged to suppress a transmission of a vibration from the pump unit to the master cylinder unit, the pump unit being integrally fixed through the vibration proofing member to an other surface which is other than the predetermined surface of the first housing, wherein the pump unit is integrally fixed so as to be positioned on a lower surface side of the master cylinder unit when the master cylinder unit is mounted to a vehicle.

* * * * *